(12) United States Patent
Oshima et al.

(10) Patent No.: US 7,484,271 B2
(45) Date of Patent: Feb. 3, 2009

(54) DEVICE CASE OPENING/CLOSING DEVICE, AND 2-AXIS HINGE DEVICE

(75) Inventors: Kazuyoshi Oshima, Naruto-machi (JP); Kenji Tomizawa, Shibayama-machi (JP); Manabu Hasegawa, Chiba (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 174 days.

(21) Appl. No.: 10/551,623

(22) PCT Filed: Apr. 2, 2004

(86) PCT No.: PCT/JP2004/004853

§ 371 (c)(1),
(2), (4) Date: Sep. 30, 2005

(87) PCT Pub. No.: WO2004/090355

PCT Pub. Date: Oct. 21, 2004

(65) Prior Publication Data

US 2006/0179612 A1    Aug. 17, 2006

(30) Foreign Application Priority Data

Apr. 3, 2003   (JP) ............................. 2003-100482
Sep. 8, 2003   (JP) ............................. 2003-315570

(51) Int. Cl.
*E05D 3/06*   (2006.01)
(52) U.S. Cl. .......................................... 16/366; 16/330
(58) Field of Classification Search .................. 16/366, 16/369, 302, 303, 330; 379/433.12, 433.13; 455/575.1, 575.4, 575.3, 575.8, 550.1, 90.3; 361/814, 680–683; 348/373, 794, 333.06
See application file for complete search history.

(56) References Cited

U.S. PATENT DOCUMENTS 5,052,078 A * 10/1991 Hosoi .......................... 16/297

(Continued)

FOREIGN PATENT DOCUMENTS

| DE | 4016875 A1 | 11/1991 |
| DE | 19618325 A1 | 4/1997 |
| JP | 11050727 A * | 2/1999 |

OTHER PUBLICATIONS

Office Action in Japanese Application No. 2003-315570 dated Jul. 29, 2008 (3 pages).

(Continued)

*Primary Examiner*—Chuck Y. Mah
(74) *Attorney, Agent, or Firm*—Osha Liang LLP

(57) ABSTRACT

A first abutment surface 24 for restricting an initial position of a hinge main body 5, and a second abutment surface 25 for restricting a terminal position of the hinge main body 5 are formed on the transmission case 2. A third abutment surface 34 for restricting an intermediate position of a reception case 3 is formed on the reception case 3. Between the transmission case 2 and the hinge main body 5, there are provided a first turn biasing means (not shown) adapted to turn bias the hinge main body 5 to the initial position, and a second turn biasing means (not shown) adapted to turn bias the hinge main body 5 to the terminal position. Between the reception case 3 and the hinge main body 5, there are provided a third turn biasing means (not shown) adapted to turn bias the reception case 3 to a folded position, and a fourth turn biasing means (not shown) adapted to turn bias the reception case 3 to a transmission position. The turn biasing force of the first turn biasing means is larger than that of the third turn biasing means. The turn biasing force of the fourth turn biasing means is larger than that of the second turn biasing means.

18 Claims, 21 Drawing Sheets

U.S. PATENT DOCUMENTS

| | | | |
|---|---|---|---|
| 5,666,694 | A | 9/1997 | Slow et al. |
| 6,253,419 | B1 | 7/2001 | Lu et al. |
| 6,785,936 | B2 * | 9/2004 | Koshikawa .................. 16/328 |
| 6,832,411 | B2 * | 12/2004 | Koshikawa et al. ........... 16/330 |
| 6,904,644 | B2 * | 6/2005 | Oshima et al. ................ 16/330 |
| 7,027,845 | B2 * | 4/2006 | Sudo ....................... 455/575.1 |
| 7,140,074 | B2 * | 11/2006 | Han et al. ..................... 16/366 |
| 7,155,266 | B2 * | 12/2006 | Stefansen ................ 455/575.3 |
| 2002/0069482 | A1 * | 6/2002 | Oshima et al. ................ 16/303 |
| 2004/0212956 | A1 * | 10/2004 | Kuivas et al. ............... 361/683 |
| 2005/0236869 | A1 * | 10/2005 | Ka et al. ..................... 296/192 |
| 2005/0239520 | A1 * | 10/2005 | Stefansen ................ 455/575.1 |
| 2006/0236505 | A1 * | 10/2006 | Maatta et al. ................. 16/366 |

OTHER PUBLICATIONS

Patent Abstracts of Japan, Publication No. 09-130058, Publication Date May 16, 2997 (8 pages).

Mechanical English translation of Patent Abstracts of Japan, Publication No. 09-130058, Publication Date May 16, 1997 (15 pages).

Patent Abstracts of Japan, Publication No. 11-351237, Publication Date Dec. 24, 1999 (5 pages).

Mechanical English Translation of Patent Abstracts of Japan, Publication No. 11-351237, Publication Date Dec. 24, 1999 (11 pages).

Patent Abstracts of Japan, Publication No. 08-179854, Publication Date Jul. 12, 1996 (4 pages).

Mechanical English Translation of Patent Abstracts of Japan, Publication No. 08-179854, Publication Date Jul. 12, 1996 (7 pages).

Patent Abstracts of Japan, Publication No. 2002-227825, Publication Date Aug. 14, 2002 (9 pages).

Mechanical English translation of Patent Abstracts of Japan, Publication No. 2002-227825, Publication Date Aug. 14, 2002 (24 pages).

Supplementary European Search Report for European Application No. 04725541.9, dated May 13, 2008 (3 pages).

* cited by examiner

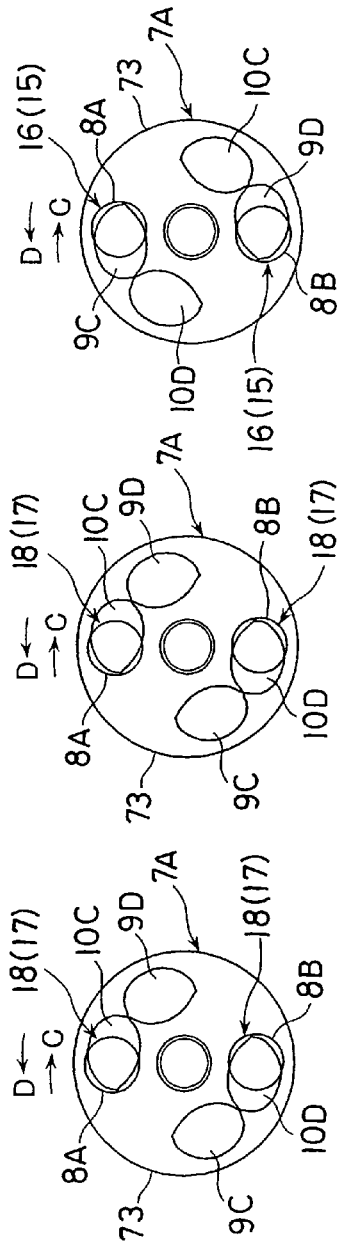
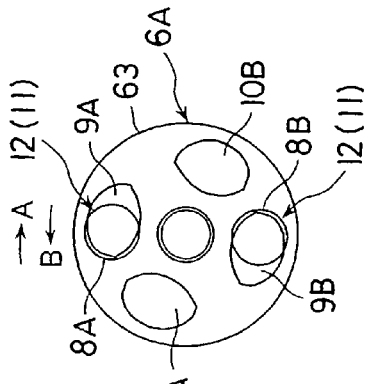
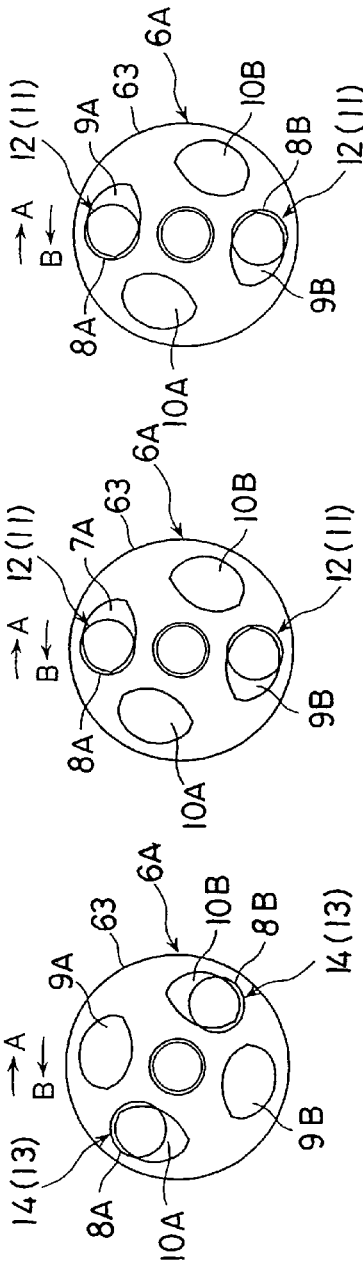

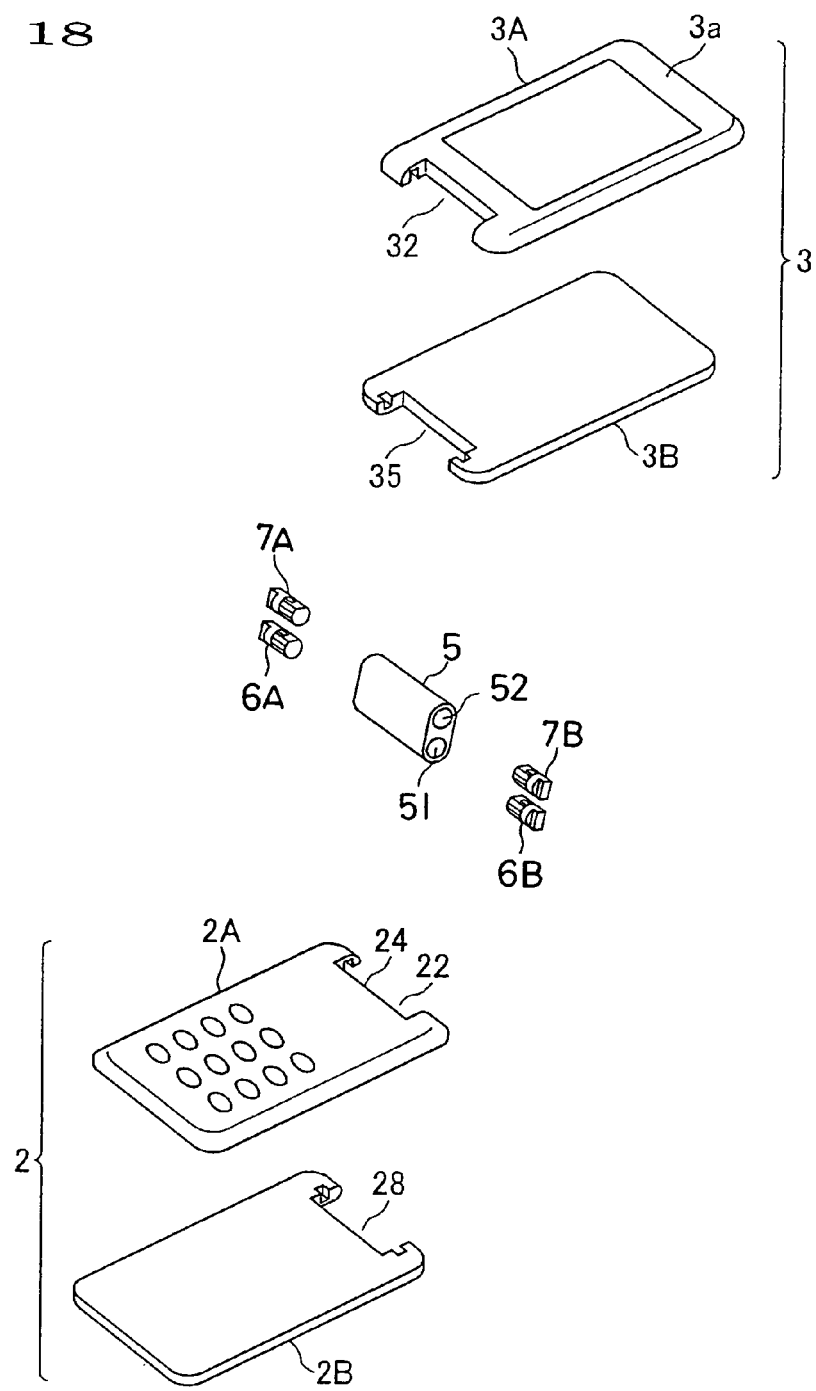

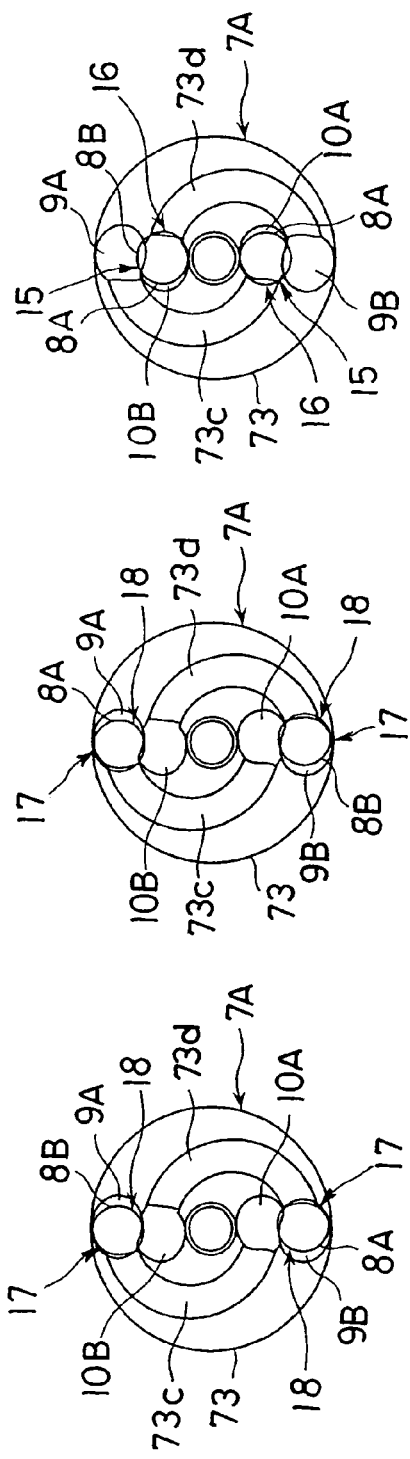
FIG. 26(A) FIG. 26(B) FIG. 26(C)
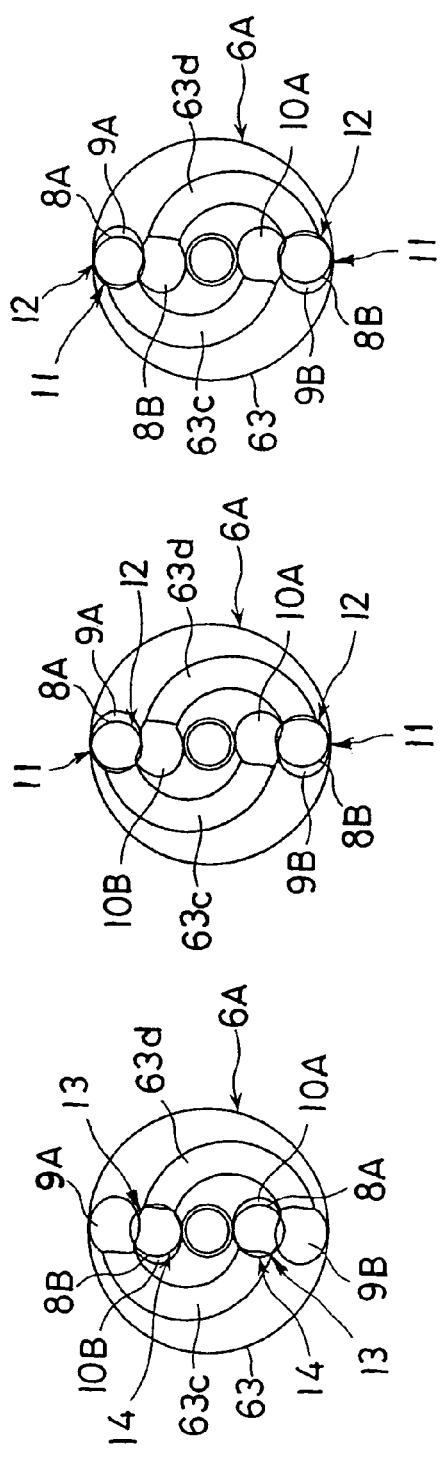

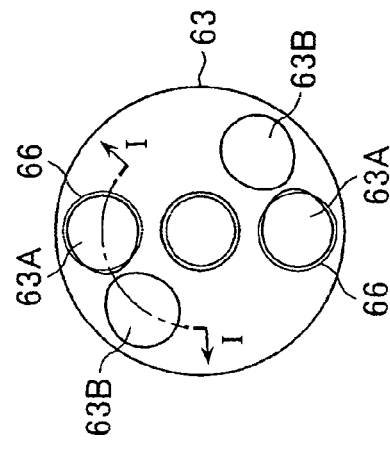
FIG. 31(A)
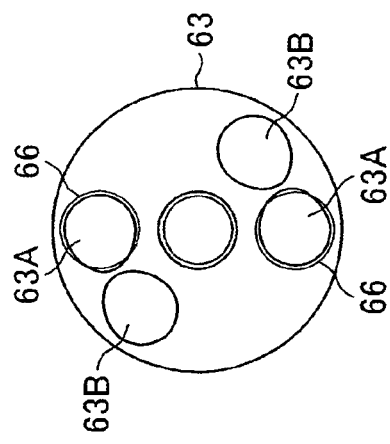
FIG. 31(B)
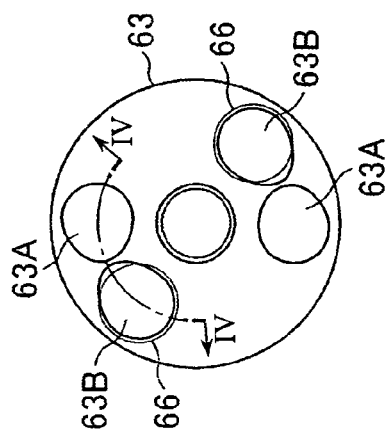
FIG. 31(C)
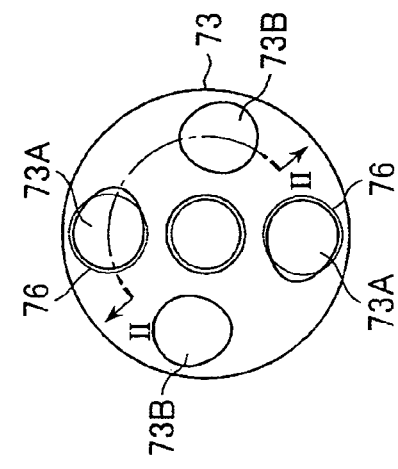
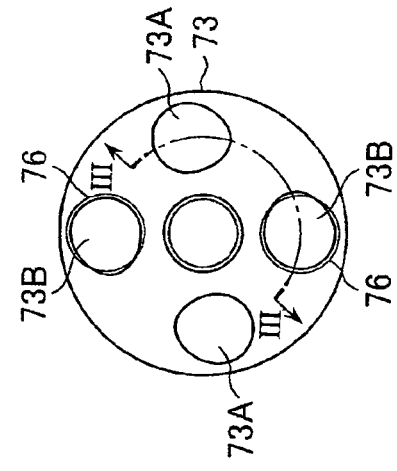
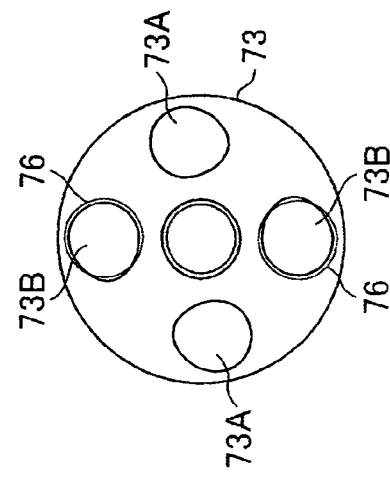

DEVICE CASE OPENING/CLOSING DEVICE, AND 2-AXIS HINGE DEVICE

TECHNICAL FIELD

This invention relates to an opening/closing apparatus for turnably connecting equipment parts such as a transmission case and a reception case of a portable cellular telephone set, or a main body case with input keys provided thereon and a display case with a liquid crystal display provided thereon of a notebook type personal computer. The invention also relates to a two-axis hinge apparatus suitably used for such opening/closing apparatus.

BACKGROUND ART

Japanese Utility Model Publication No. H07-15186 and Japanese Patent Application Laid-Open No. 2002-118633 disclose an opening/closing apparatus for an equipment case, in which a transmission case and a reception case for a portable cellular telephone set are turnably connected to each other through a two-axis hinge apparatus. In this opening/closing apparatus, a transmission case is turnably connected to one end part of a hinge main body of a two-axis hinge apparatus through a first hinge shaft, and a reception case is turnably connected to the other end part of the hinge main body through a second hinge shaft. Owing to this arrangement, the reception case and the transmission case are turnably connected to each other through an opening/closing apparatus.

In the above-mentioned conventional opening/closing apparatus for an equipment case, since the transmission case and the reception case are merely turnably connected to a hinge main body through first and second hinge shafts, a determination cannot be made as to whether the reception case is turned with respect to the hinge main body or the hinge main body is turned with respect to the transmission case when the reception case is to be turned with respect to the transmission case. In other words, no turning order is firmly established between the reception case and the hinge main body. Therefore, the turning order between the reception case and the hinge main body is changed every time the reception case is turned with respect to the transmission case. This gives rise to a user having a sense of uncomfortability.

DISCLOSURE OF THE INVENTION

According to a first mode of the present invention, there is provided an opening/closing apparatus for an equipment case comprising a first case, a hinge apparatus having a hinge main body whose one end part is turnably connected to the first case about a first turning axis, and a second case turnably connected to the other end part of the hinge main body about a second turning axis parallel to the first turning axis, the hinge main body being turned with respect to the first case and the second case being turned with respect to the hinge main body thereby the second case being turnable with respect to the first case between a folded position and a developing position, wherein between the first case and the hinge main body, there are provided a first stop means adapted to stop the hinge main body in a predetermined initial position when the hinge main body is turned to the predetermined initial position in a first direction so that the second case is turned toward the folded position from the developing position, a second stop means adapted to stop the hinge main body in a predetermined terminal position when the hinge main body is turned to the predetermined terminal position in a second direction so that the second case is turned toward the developing position from the folded position, a first turn prohibition means adapted to prohibit the hinge main body from turning in a second direction from the initial position with a predetermined force, and a second turn prohibition means adapted to prohibit the hinge main body from turning in the first direction from the terminal position with a predetermined force, between the second case and the hinge main body, there are provided a third stop means adapted to stop the second case in a predetermined intermediate position when the second case is turned to the predetermined intermediate position on the way toward the folded position from the developing position in an opening direction with respect to the hinge main body, a third turn prohibition means adapted to prohibit the second case from turning in the opening direction from the folded position with a predetermined force, and a fourth turn prohibition means adapted to prohibit the second case from turning toward the folded position from the intermediate position in a closing direction with a predetermined force, and the prohibiting force of the first turn prohibition means is set to be larger than the prohibiting force of the third turn prohibition means, and the prohibiting force of the fourth turn prohibition means is set to be larger than the prohibiting force of the second turn prohibition means.

In the above-mentioned arrangement, it is desirable that the first turn prohibition means is a first turn biasing means adapted to turn bias the hinge main body in the first when the hinge main body is located in the initial position, the second turn prohibition means is a second turn biasing means adapted to turn bias the hinge main body in the second direction when the hinge main body is located in the terminal position, the third turn prohibition means is a third turn biasing means adapted to turn bias the second case in the closing direction when the second case is located in the folded position, and the fourth prohibition means is a fourth turn biasing means adapted to turn bias the second case in the opening direction when the second case is located in the intermediate position.

It is desirable that the hinge apparatus includes a first hinge for turnably connecting the first case and one end part of the hinge main body together about the first turning axis, and a second hinge for turnably connecting the second case and the other end part of the hinge main body together about the second turning axis, the first hinge includes a first movable member disposed at one of the first case and the hinge main body such that the first movable member is non-turnable but movable in the direction of the first turning axis, and a first biasing means adapted to bias the first movable member toward the other of the first case and the hinge main body, between confronting surfaces of the first movable member and the other of the first case and the hinge main body, there are provided a first conversion means adapted to convert the biasing force of the first biasing means acting on the first movable member when the hinge main body is located in the initial position, into a turn biasing force for turn biasing the hinge main body in the first direction, and a second conversion means adapted to convert the biasing force of the first biasing means acting on the first movable member when the hinge main body is located in the terminal position, into a turn biasing force for turn biasing the hinge main body in the second direction, the first turn biasing means is constituted by the first biasing means and the first conversion means, and the second turn biasing means is constituted by the first biasing means and the second conversion means, the second hinge includes a second movable member disposed at one of the second case and the hinge main body such that the second movable member is non-turnable but movable in the direction of the second turning axis, and a second biasing means adapted to bias the second movable member toward the other of the second case and the hinge main body, between confronting surfaces of the second movable member and the other of the second case and the hinge main body, there are provided a third conversion means adapted to convert the biasing force of the second biasing means acting on the second movable member when the second case located in the folded position, into a turn biasing force for turn biasing the second case in the closing direction, and a fourth conversion means adapted to convert the biasing force of the second biasing means acting on the second movable member when the second case is located in the intermediate position, into a turn biasing force for turn biasing the second case in the opening direction, and the third turn biasing means is constituted by the second biasing means and the third conversion means, and the fourth turn biasing means is constituted by the second biasing means and the fourth conversion means.

The folded position may be restricted by abutment of the second case against the first case.

It is desirable that the intermediate position is defined such that when the second case is located in the intermediate position, the second case is located on a line orthogonal to the first and second turning axes.

According to a second mode of the present invention, there is provided a two-axis hinge apparatus comprising a hinge main body, a first hinge disposed on the hinge main body with an axis thereof aligned with a first turning axis, and a second hinge disposed on the hinge main body with an axis thereof aligned with a second turning axis parallel to the first turning axis, wherein the first hinge includes a first fixing member non-turnably disposed on the hinge main body and a first turnable member connected to the first fixing member such that the first turnable member is turnable between a first initial position and a first turning position, between the first fixing member and the first turnable member, there are provided a first turn prohibition means adapted to prohibit the first turnable member from turning toward the first turning position from the first initial position with a predetermined force, a second turn prohibition means adapted to prohibit the first turnable member from turning toward the first initial position from the first turning position with a predetermined force, and a first stop means adapted to stop the first turnable member, which would otherwise be turned toward the first initial position from the first turning position, in the first initial position with a predetermined force, the second hinge includes a second fixing member non-turnably disposed on the hinge main body and a second turnable member connected to the second fixing member such that the second turnable member is turnable between a second initial position and a second turning position, between the second fixing member and the second turnable member, there are provided a third turn prohibition means adapted to prohibit the second turnable member from turning toward the second turning position from the second initial position with a predetermined force, a fourth turn prohibition means adapted to prohibit the second turnable member from turning toward the second initial position from the second turning position with a predetermined force, and a fourth stop means adapted to stop the second turnable member, which would otherwise be turned toward the second initial position from the second turning position, in the second turning position with a predetermined force, the turning direction toward the first turning position from the first initial position and the turning direction toward the second turning position from the second initial position are set to be same in direction, the turn prohibiting force of the first turn prohibition means is set to be larger than the turn prohibiting force of the third turn prohibition means, the stopping force of the fourth stop means is set to be larger than the turn prohibiting force of the first turn prohibition means, the turn prohibiting force of the fourth turn prohibition means is set to be larger than the turn prohibiting force of the second turn prohibition means, and the stopping force of the first stop means is set to be larger than the turn prohibiting force of the fourth turn prohibition means.

In the above-mentioned arrangement, it is desirable that the first hinge further includes a first movable member disposed between the first fixing member and the first turnable member and connected to the first fixing member such that the first movable member is non-turnable but movable in a direction of the first turning axis, and a first biasing means adapted to bias the first movable member toward the first turnable member along the first turning axis, between confronting surfaces of the first turnable member and the first movable member, there are provided a first conversion means adapted to convert a biasing force of the first biasing means acting on the first movable member when the first turnable member is located in the first initial position, into a turn biasing force for turn biasing the first turnable member toward the first initial position from the first turnable position, a second conversion means adapted to convert a biasing force of the first biasing means acting on the first movable member when the first turnable member is located in the first turnable position, into a turn biasing force for turn biasing the first turnable member toward the first turnable position from the first initial position, and the first stop means, the first turn prohibition means is constituted by the first conversion means and the first biasing means, and the second turn prohibition means is constituted by the second conversion means and the first biasing means, and the first turnable member, biased by the first conversion means, is stopped in the first initial position by the first stop means, the second hinge further includes a second movable member disposed between the second fixing member and the second turnable member and connected to the second fixing member such that the second movable member is non-turnable but movable in the direction of the second turning axis, and a second biasing means adapted to bias the second movable member toward the second turnable member along the second turning axis, between confronting surfaces of the second turnable member and the second movable member, there are provided a third conversion means adapted to convert a biasing force of the second biasing means acting on the second movable member when the second turnable member is located in the second initial position into a turn biasing force for turn biasing the second turnable member toward the second initial position from the second turning position, a fourth conversion means adapted to convert a turn biasing force of the second biasing means acting on the second movable member when the second turnable member is located in the second turning position, into a turn biasing force for turn biasing the second turnable member toward the second turning position from the second initial position, and the fourth stop means, the third turn prohibition means is constituted by the third conversion means and the second biasing means, the fourth turn prohibition means is constituted by the fourth conversion means and the second biasing means, and the second turnable member, turn biased by the fourth conversion means, is stopped in the second turnable position by the fourth stop means.

According to a third mode of the present invention, there is provided a two-axis hinge apparatus comprising a hinge main body, a first hinge disposed on the hinge main body with an axis thereof aligned with a first turning axis, and a second hinge disposed on the hinge main body with an axis thereof aligned with a second turning axis parallel to the first turning axis, wherein the first hinge includes a first fixing member non-turnably disposed on the hinge main body and a first turnable member connected to the first fixing member such that the first turnable member is turnable between a first initial position and a first turning position, between the first fixing member and the first turnable member, there are provided a first turn prohibition means adapted to prohibit the first turnable member from turning toward the first turning position from the first initial position with a predetermined force, a second turn prohibition means adapted to prohibit the first turnable member from turning toward the first initial position from the first turning position with a predetermined force, a first stop means adapted to stop the first turnable member in the first initial position on the way toward the first initial position from the first turning position with a predetermined force, and a second stop means adapted to stop the first turnable member in the first turning position on the way toward the first turning position from the first initial position with a predetermined force, the second hinge includes a second fixing member non turnably disposed on the hinge main body and a second turnable member connected to the second fixing member such that the second turnable member is turnable between a second initial position and a second turning position, between the second fixing means and the second turnable member, there are provided a third turn prohibition means adapted to prohibit the second turnable member from turning toward the second turning position from the second initial position with a predetermined force, and a fourth turn prohibition means adapted to prohibit the second turnable member from turning toward the second initial position from the second turning position with a predetermined force, the turning direction toward the first turning position from the first initial position and the turning direction toward the second turning position from the second initial position are set to be same in direction, the turn prohibiting force of the first turn prohibition means is set to be smaller than the turn prohibiting force of the third turn prohibition means, the stopping force of the second stop means is set to be larger than the turn prohibiting force of the third turn prohibition means, the turn prohibiting force of the fourth turn prohibition means is set to be larger than the turn prohibiting force of the second turn prohibition means, and the stopping force of the first stop means is set to be larger than the turn prohibiting force of the fourth turn prohibition means.

In the above-mentioned arrangement, it is desirable that the first hinge further includes a first movable member disposed between the first fixing member and the first turnable member and connected to the first fixing member such that the first movable member is non-turnable but movable in the direction of the first turning axis, and a first biasing means adapted to bias the first movable member toward the first turnable member along the first turning axis, between confronting surfaces of the first turnable member and the first movable member, there are provided a first conversion means adapted to convert a biasing force of the first biasing means acting on the first movable member when the first turnable member is located in the first initial position, into a turn biasing force for turn biasing the first turnable member toward the first initial position from the first turning position, a second conversion means adapted to convert a biasing force of the first biasing means acting on the first movable member when the first turnable member is located in the first turning position, into a turn biasing force for turn biasing the first turnable member toward the first turning position from the first initial position, the first stop means and the second stop means, the first turn prohibition means is constituted by the first conversion means and the first biasing means, the second turn prohibition means is constituted by the second conversion means and the first biasing means, the first turnable member, which is turn biased by the first conversion means, is stopped in the first initial position by the first stop means, and the first turnable member, which is turn biased by the second conversion means, is stopped in the first turning position by the second stop means, the second hinge further includes a second movable member disposed between the second fixing member and the second turnable member and connected to the second fixing member such that the second movable member is non turnable but movable in the direction of the second turning axis, and a second biasing means adapted to bias the second movable member toward the second turnable member along the second turning axis, between confronting surfaces of the second turnable member and the second movable member, there are provided a third conversion means adapted to convert a biasing force of the second biasing means acting on the second movable member when the second turnable member is located in the second initial position into a turn biasing force for turn biasing the second turnable member toward the second initial position from the second turning position, and a fourth conversion means adapted to convert a biasing force of the second biasing means acting on the second movable member when the second turnable member is located in the second turning position into a turn biasing force for turn biasing the second turnable member toward the second turning position from the second initial position, the third turn prohibition means is constituted by the third conversion means and the second biasing means, and the fourth turn prohibition means is constituted by the fourth conversion means and the second biasing means.

According to a fourth mode of the present invention, there is provided a two-axis hinge apparatus comprising a hinge main body, a first hinge disposed on the hinge main body with an axis thereof aligned with a first turning axis, and a second hinge disposed on the hinge main body with an axis thereof aligned with a second turning axis parallel to the first turning axis, wherein the first hinge includes a first fixing member non-turnably disposed on the hinge main body and a first turnable member connected to the first fixing member such that the first turnable member is turnable between the first initial position and the first turning position, between the first fixing member and the first turnable member, there are provided a first turn prohibition means adapted to prohibit the first turnable member from turning toward the first turning position from the first initial position with a predetermined force and a second turn prohibition means adapted to prohibit the first turnable member from turning toward the first initial position from the first turning position with a predetermined force, the second hinge includes a second fixing member non-turnably disposed on the hinge main body and a second turnable member connected to the second fixing member such that the second turnable member is turnable between the second initial position and the second turning position, between the second fixing member and the second turnable member, there are provided a third turn prohibition means adapted to prohibit the second turnable member from turning toward the second turning position from the second initial position with a predetermined force, a fourth turn prohibition means adapted to prohibit the second turnable member from turning toward the second initial position from the second turning position with a predetermined force, a third stop means adapted to stop the second turnable member in the second initial position on the way toward the second initial position from the second turning position with a predetermined force, and a fourth stop means being adapted to stop the second turnable member in the second turning position on the way toward the second turning position from the second initial position with a predetermined force, the turning direction toward the first turning position from the first initial position and the turning direction toward the second turning position from the second initial position are set to be same in direction, the turn prohibiting force of the first turn prohibition means is set to be larger than the turn prohibiting force of the third turn prohibition means, the stopping force of the fourth stop means is set to be larger than the turn prohibiting force of the first turn prohibition means, the turn prohibiting force of the second turn prohibition means is set to be larger than the turn prohibiting force of the fourth turn prohibition means, and the turn prohibiting force of the second turn prohibition means is set to be smaller than the stopping force of the third stop means.

In the above-mentioned arrangement, it is desirable that the first fixing member further includes a first movable member disposed between the first fixing member and the first turnable member and connected to the first fixing member such that the first movable member is non-turnable but movable in the direction of the first turning axis, and a first biasing member adapted to bias the first movable member toward the first turnable member along the first turning axis, between confronting surfaces of the first turnable member and the first movable member, there are provided a first conversion means adapted to convert a biasing force of the first biasing means acting on the first movable member when the first turnable member is located in the first initial position, into a turn biasing force for turn biasing the first turnable member toward the first initial position from the first turning position, and a second conversion means adapted to convert a biasing force of the first biasing means acting on the first movable member when the first movable member is located in the first turning position, into a turn biasing force for turn biasing the first turnable member toward the first turning position from the first initial position, the first turn prohibition means is constituted by the first conversion means and the first biasing means, and the second turn prohibition means is constituted by the second conversion means and the first biasing means, the second hinge further includes a second movable member disposed between the second fixing member and the second turnable member and connected to the second fixing member such that the second movable member is non-turnable but movable in the direction of the second turning axis, and a second biasing means adapted to bias the second movable member toward the second turnable member along the second turning axis, between confronting surfaces of the second turnable member and the second movable member, there are provided a third conversion means adapted to convert a biasing force of the second biasing means acting on the second movable member when the second movable member is located in the second initial position, into a turn biasing force for turn biasing the second turnable member toward the second initial position from the second turning position; a fourth conversion means adapted to convert a biasing force of the second biasing means acting on the second movable member when the second turnable member is located in the second turning position, into a turn biasing force for turn biasing the second turnable member toward the second turning position from the second initial position, a third stop means and a fourth stop means, the third turn prohibition means is constituted by the third conversion means and the second biasing means, the fourth turn prohibition means is constituted by the fourth conversion means and the second biasing means, the turnable member, which is turn biased by the third conversion means, is stopped in the second initial position by the third stop means, and the second turnable member, which is turn biased by the fourth conversion means, is stopped in the second turning position by the fourth stop means.

According to a fourth mode of the present invention, there is provided a two-axis hinge apparatus comprising a hinge main body, a first hinge disposed on the hinge main body with an axis thereof aligned with a first turning axis, and a second hinge disposed on the hinge main body with an axis thereof aligned with a second turning axis parallel to the first turning axis, wherein the first hinge includes a first fixing member non-turnably disposed on the hinge main body and a first turnable member connected to the first fixing member such that the first turnable member is turnable between a first initial position and a first turning position, between the first fixing member and the first turnable member, there are provided a first turn prohibition means adapted to prohibit the first turnable member from turning toward the first turning position from the first initial position with a predetermined force, a second turn prohibition means adapted to prohibit the first turnable member from turning toward the first initial position from the first turning position with a predetermined force, and a second stop means adapted to stop the first turnable member in the first turning position on the way toward the first turning position from the first initial position with a predetermined force, the second hinge includes a second fixing member non-turnably disposed on the hinge main body and a second turnable member connected to the second fixing member such that the second turnable member is turnable between a second initial position and a second turning position, between the second fixing member and the second turnable member, there are provided a third turn prohibition means adapted to prohibit the second turnable member from turning toward the second turning position from the second initial position with a predetermined force, a fourth turn prohibition means adapted to prohibit the second turnable member from turning toward the second initial position from the second turning position with a predetermined force, and a third stop means adapted to stop the second turnable member, which would otherwise be turned toward the second initial position from the second turning position, in the second initial position with a predetermined force, the turning direction toward the first turning position from the first initial position and the turning direction toward the second turning position from the second initial position are set to be same in direction, the turn prohibiting force of the first turn prohibition means is set to be smaller than the turn prohibiting force of the third turn prohibition means, the stopping force of the second stop means is set to be larger than the turn prohibiting force of the third turn prohibition means, the turn prohibiting force of the second turn prohibition means is set to be larger than the turn prohibiting force of the fourth turn prohibition means, and the turn prohibiting force of the second turn prohibition means is set to be smaller than the stopping force of the second stop means.

In the above-mentioned arrangement, it is desirable that the first hinge further includes a first movable member disposed between the first fixing member and the first turnable member and connected to the first fixing member such that the first movable member is non-turnable but movable in the direction of the first turning axis, and a first biasing means adapted to bias the first movable member toward the first turnable member along the first turning axis, between confronting surfaces of the first turnable member and the first movable member, there are provided a first conversion means adapted to convert a biasing force of the first biasing means acting on the first movable member when the first turnable member is located in the first initial position into a turn biasing force for turn biasing the first turnable member toward the first initial position from the first turning position, a second conversion means adapted to convert a biasing force of the first biasing means acting on the first movable member when the first turnable member is located in the first turning position into a turn biasing force for turn biasing the first turnable member toward the first turning position from the first initial position, and the second stop means, the first turn prohibition means is constituted by the first conversion means and the first biasing means, the second turn prohibition means is constituted by the second conversion means and the first biasing means, and the first turnable member, which is turn biased by the second conversion means, is stopped in the first turning position by the second stop means, the second hinge further includes a second movable member disposed between the second fixing member and the second turnable member and connected to the second fixing member such that the second movable member is non-turnable but movable in the direction of the second turning axis, and a second biasing means adapted to bias the second movable member towards the second turnable member along the second turning axis, between confronting surfaces of the second turnable member and the second movable member, there are provided a third conversion means adapted to convert a biasing force of the second biasing means acting on the second movable member when the second turnable member is located in the second initial position into a turn biasing force for turn biasing the second turnable member toward the second initial position from the second turning position, a fourth conversion means adapted to convert a biasing force of the second biasing means acting on the second movable member when the second turnable member is located in the second turning position into a turn biasing force for turn biasing the second turnable member toward the second turning position from the second initial position, and the third stop means, and the third turn prohibition means is constituted by the third conversion means and the second biasing means, the fourth turn prohibition means is constituted by the fourth conversion means and the second biasing means, and the second turnable member, which is turn biased by the third conversion means, is stopped in the second initial position by the third stop means.

BRIEF DESCRIPTION OF DRAWINGS

FIG. 16(A) is an explanatory view showing a relation between spherical bodies and recesses of the first hinge and a relation between spherical bodies and recesses of the second hinge, in which the reception case is located in the folded position.

FIG. 16(B) is the same view as FIG. 16(A), but in which the reception case is located in the intermediate position.

FIG. 16(C) is the same view as FIG. 16(A), but in which the reception case is located in the transmission position.

FIG. 18 is an exploded perspective view of the second embodiment.

FIG. 26(A) is an explanatory view showing a relation between spherical bodies and recesses of the first hinge and a relation between spherical bodies and recesses of a second hinge, in which the reception case is located in the folded position.

FIG. 26(B) is the same view as FIG. 26(A), but in which the reception case is located in the intermediate position.

FIG. 26(C) is the same view as FIG. 26(A), but in which the reception case is located in the transmission position.

FIG. 31(A) is an explanatory view showing a relation between two pairs of first engagement recesses and a pair of spherical bodies which are formed at one end face of a first turnable member which is employed in the first hinge of the first embodiment and a relation between two pairs of second engagement recesses and a pair of spherical bodies which are formed at one end face of a second turnable member which is employed in the second hinge of the first embodiment, in which the reception case is located in the folded position.

FIG. 31(B) is the same view as FIG. 31(A), but in which the reception case is located in the intermediate position.

FIG. 31(C) is the same view as FIG. 31(A), but in which the reception case is located in the transmission position.

BEST MODE FOR CARRYING OUT THE INVENTION

Embodiments of the present invention will be described hereinafter with reference to FIGS. 1 through 35.

Figure 1A:
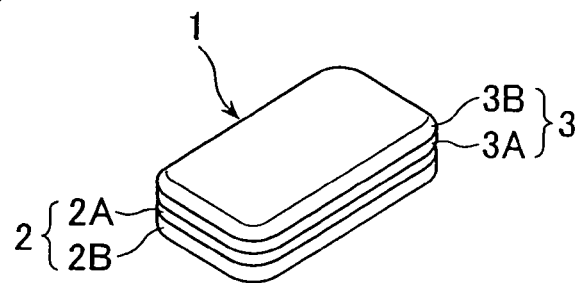
FIG. 1(A) is a perspective view showing a portable cellular telephone set as a first embodiment for carrying out a first aspect of the present invention, in which a reception case is located in a folded position.
Figure 1B:
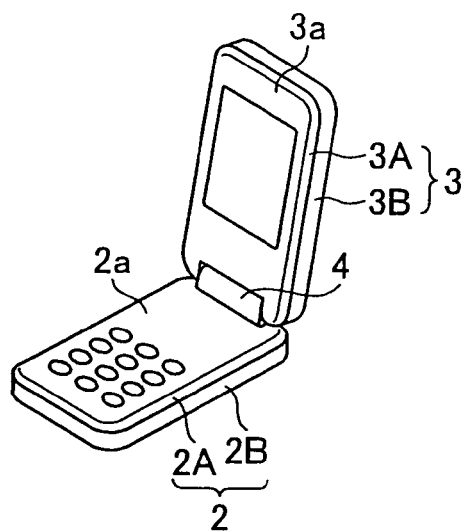
FIG. 1(B) is the same view as FIG. 1(A), but in which the reception case is located in an intermediate position.
Figure 1C:
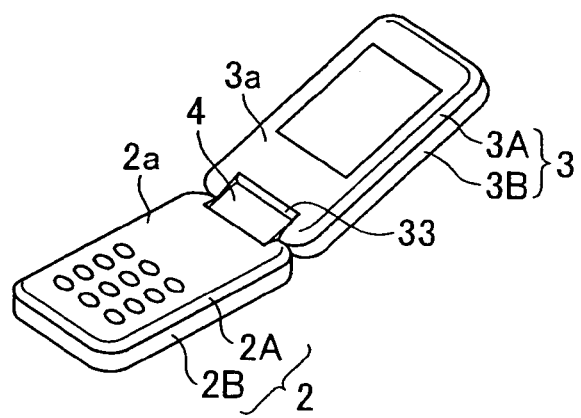
FIG. 1(C) is the same view as FIG. 1(A), but in which the reception case is located in a transmission position.
Figure 2:
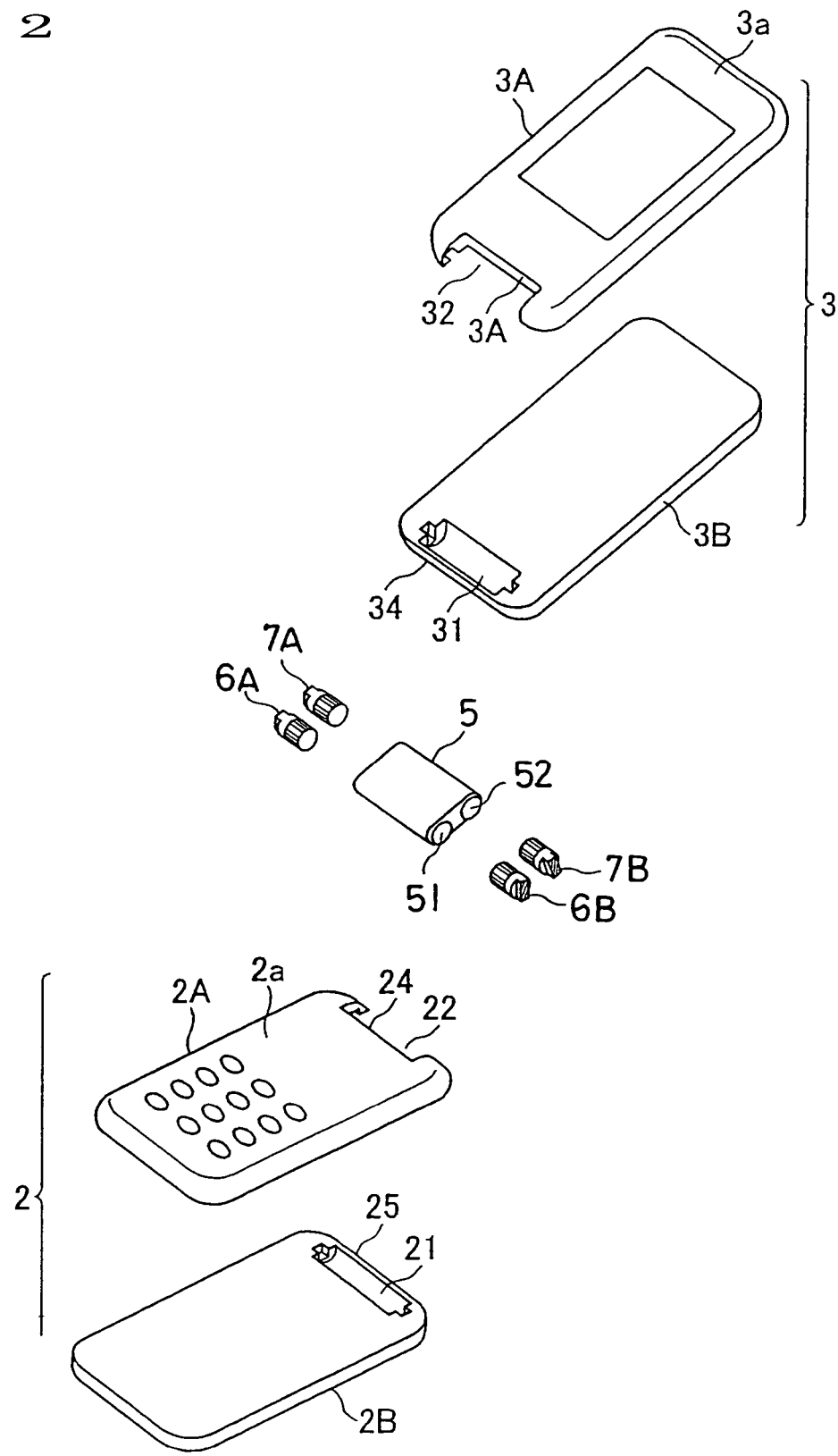
FIG. 2 is an exploded perspective view of the first embodiment.

FIGS. 1 through 16 show a first embodiment according to a first mode of the present invention. In this embodiment, an opening/closing apparatus for an equipment case according to the present invention is applied to a portable cellular telephone set. As shown in FIGS. 1 and 2, the portable cellular telephone set 1 includes a transmission case (first case) 2 provided with a transmission section, and a reception case (second case) 3 provided with a reception section. The reception case 3 is turnably connected to the transmission case 2 through a hinge apparatus 4. The reception case 3 is turnable between a folded position shown in FIGS. 1(A) and 5 and a transmission position (developing position) shown in FIGS. 1(C) and 7. The folded position is restricted by abutment of the front surface 3a of the reception case 3 against the front surface 2a of the transmission case 2. The turn angle of the reception case 3 with respect to the transmission case 2 is zero (0) degrees. On the other hand, the transmission position is a position attainable when the reception case 3 is turned a maximum amount with respect to the transmission case 2. In this embodiment, the transmission position is set to a position 160 degrees away from the folded position. The transmission position, as later described, is restricted by abutment of a hinge main body 5 of the hinge apparatus 4 against a second abutment surface 25 of the transmission case 2 and by abutment of a third abutment surface 34 of the reception case 3 against the hinge main body 5. As shown in FIGS. 1(B) and 6, an intermediate position is set when the reception case 3 is turned by a predetermined angle (one hundred (100) degrees in this embodiment) from the folded position toward the transmission position. The intermediate position, as later described, is restricted by abutment of the third abutment surface 34 against the hinge main body 5.

The transmission case 2 and the reception case 3 are turnable relative to each other. For the sake of convenience of explanation, however, the description to follow will be made on the assumption that transmission case 2 is fixed in position and the reception case 3 is turned relative to the transmission case 2.

As shown in FIGS. 1 and 2, the transmission case 2 includes an upper half body 2A which is brought into abutment against the reception case 3 when the reception case 3 is turned to the folded position, and a lower case half body 2B fixed to under the upper case half body 2A in a superimposed manner. The case half bodies 2A, 2B each have a thin rectangular parallelepiped contour. A recess 21 is formed in one end part in the longitudinal direction of the confronting surface with the upper case half body 2A of the lower case half body 2B. A cutout part 22 is formed in one end part in the longitudinal direction of the upper case half body 2A confronting this recess 21. Constituted by the cutout part 22 and the recess 21 is a receiving recess 23 whose longitudinal direction is directed in the short direction of the transmission case 2 and which is formed at one end part in the longitudinal direction of the transmission case 2.

The reception case 3 includes a lower case half body 3A which is brought into abutment against the transmission case 2 when the reception case 3 is turned to the folded position, and an upper case half body 3B fixed above the lower case half body 3A in a superimposed manner. The case half bodies 3A, 3B each have a thin rectangular parallelepiped contour. A recess 31 is formed in one end part in the longitudinal direction of the confronting surface with the upper case half body 3A of the upper case half body 3B. A cutout part 32 is formed in one end part in the longitudinal direction of the lower case half body 3A confronting the recess 31. By the cutout part 32 and the recess 31, a receiving recess 33 whose longitudinal direction is directed in the short direction of the reception case 3 is constituted in one end part in the longitudinal direction of the reception case 3. The receiving recess 33 is arranged in parallel with the receiving recess 23.

The transmission case 2 and the reception case 3 are turnably connected to each other through the hinge apparatus 4. The hinge apparatus 4 includes a hinge main body 5. The hinge main body 5 has a thin rectangular parallelepiped contour and is arranged such that the longitudinal direction of the hinge main body 5 is directed in the same direction as the longitudinal direction of the receiving recesses 23, 33. The end parts in the short direction of the hinge main body 5 are turnably inserted in the receiving recesses 23, 33, respectively. One end part in the short direction of the hinge main body 5 is turnably connected to the transmission case 2 through a pair of first hinges 6A, 6B which are arranged at opposite end parts in the longitudinal direction of the hinge main body 5 about a first turning axis L1 (see FIG. 4). The other end part in the short direction of the hinge main body 5 is turnably connected to the reception case 3 through second hinges 7A, 7B which are arranged at opposite end parts in the longitudinal direction of the hinge main body 5 about a second turning axis L2 (see FIG. 4). Only one each of the first hinges 6A, 6B and the second hinges 7A, 7B may be used, and a hinge shaft may be used for the other of the first hinge 6A,6B and the second hinge 7A,7B.

Figure 3:
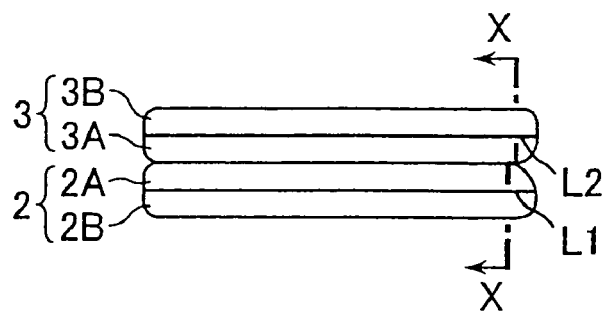
FIG. 3 is a side view of the first embodiment.
Figure 4:
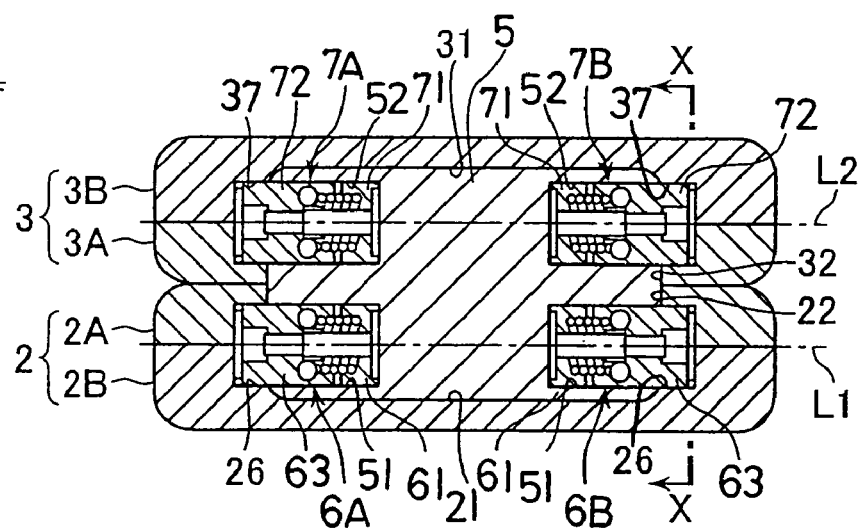
FIG. 4 is an enlarged cross sectional view taken on line X-X of FIG. 3.

The first and second turning axes L1, L2 are parallel to each other and also parallel to the longitudinal direction of the receiving recesses 23, 33. Moreover, when the hinge main body 5 is located in an initial position as later described, the second turning axis L2, as described in FIGS. 3 and 4, is offset to the other end of the reception case 3 with respect to the first turning axis L1. Due to this arrangement, when the reception case 3 is turned to the intermediate position, the reception case 3 is located on a line orthogonal to the first and second turning axes L1, L2. Particularly, in this embodiment, the abutting surface between the case half bodies 3A, 3B is located on the line orthogonal to the first and second axes. The first and second turning axes L1, L2 may be arranged in the same position in the longitudinal direction of the cases 2, 3, or they may be offset in the reverse direction in contrast with the case shown in FIG. 3.

Figure 5:
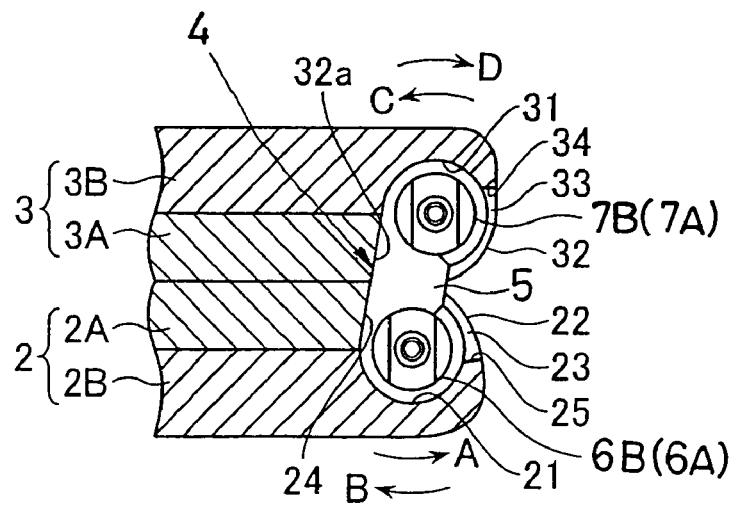
FIG. 5 is an enlarged cross sectional view, partly omitted, taken on line X-X of FIG. 4.
Figure 6:
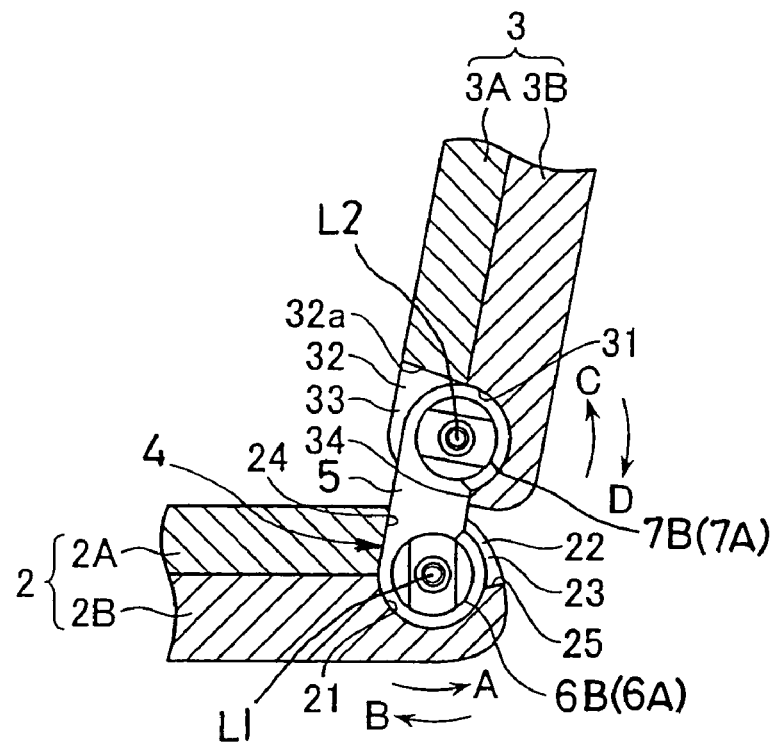
FIG. 6 is a cross sectional view, like FIG. 5, but in which the reception case is located in the intermediate position.
Figure 7:
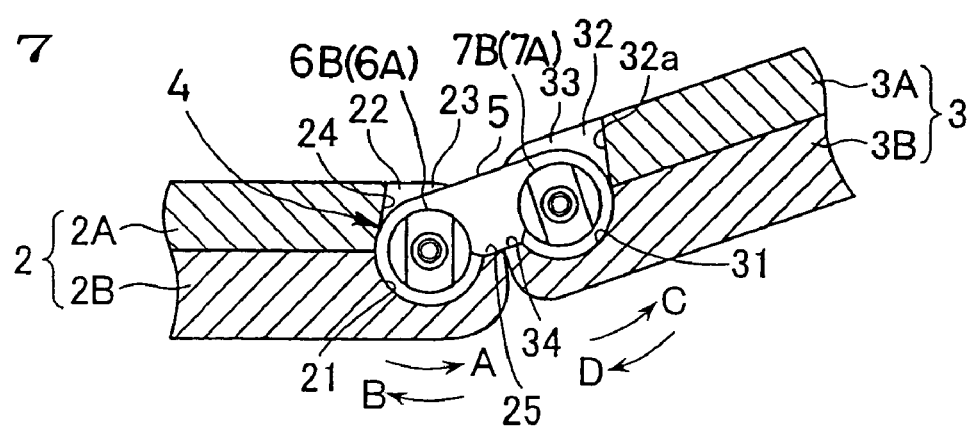
FIG. 7 is a cross sectional view, like FIG. 5, but in which the reception case is located in the transmission position.

The hinge main body 5 is turnable between the initial position shown in FIGS. 5 and 6 and the terminal position shown in FIG. 7 about the first turning axis L1 with respect to the transmission case 2. The initial position is, as shown in FIGS. 5 and 6, restricted by abutment of the hinge main body 5 against a first abutment surface (first stop means) 24 which is constituted by only a wall surface extending in the short direction of the case 2 of the entire wall surface defining the cutout part 22. The terminal position is, as shown in FIG. 7, restricted by abutment of the hinge main body 5 against a second abutment surface (second stop means) 25 which is formed on a part existing between the recess 21 and the lower case half body 2b of the entire upper surface (confronting surface with respect to the upper case half body 2A) of the lower case half body 2B.

The reception case 3 is turnable between a second initial position shown in FIG. 5 and a second terminal position shown in FIG. 6 with respect to the hinge main body 5 which is located in the initial position. The second initial position is restricted by abutment of the front surface 3a of the reception case 3 against the front surface 2a of the transmission case 2. On the other hand, the second terminal position is, as shown in FIG. 6, restricted by abutment of a third abutment surface (third stop means) 34 which is formed on a part existing between the recess 31 and one end edge of the upper case half body 3B of the entire lower surface (confronting surface with the lower case half body 3A) of the upper case half body 3B against the hinge main body 5. Therefore, as long as the hinge main body 5 is located in the initial position, the second initial position and the second terminal position of the reception case 3 are in the same positions as the folded position and the intermediate position, respectively. Moreover, as long as the hinge main body 5 is located in the initial position, the reception case 3 is turned with respect to the main body 5. Accordingly, the second initial position and the second terminal position of the reception case 3 are in the same positions as the folded position and the intermediate position, respectively. Thus, in this embodiment, the second initial position is also referred to as the folded position and the second terminal position is also referred to as the intermediate position. The folded position as one limit position in the turnable extent with respect to the hinge main body 5 of the reception case 3 may be restricted by abutment, for example, of the wall surface 32a extending in the short direction of the case 3 of the entire wall surface, which defines the cutout part 32 instead of by abutment of the reception case 3 against the transmission case 2. In that case, when the reception case 3 is turned to the folded position, a small gap is formed between the front surface 2a of the transmission case 2 and the front surface 3a of the reception case 3.

When the reception case 3 is turned from the folded position to the transmission position and when the reception case 3 is turned from the transmission position to the folded position, turning of the hinge main body 5 with respect to the transmission case 2 and turning of the reception case 3 with respect to the hinge main body 5 is made in a predetermined order, respectively, under the effect of the first hinges 6A, 6B and the second hinges 7A, 7B of the hinge apparatus 4, and under the effect of the first through third abutment surfaces 24, 25, 34.

Next, presume that the hinge main body 5 is located in the initial position and the reception case 3 is located in the folded position, as shown in FIG. 5. In this condition, when the reception case 3 is turned toward the transmission position, first, the reception case 3 is turned in the direction indicated by arrow D (opening direction), in FIGS. 5 through 7 about the second turning axis L2 with respect to the hinge main body 5. At that time, the hinge main body 5 maintains its stopping state until the reception case 3 reaches the intermediate position. When the reception case 3 reaches the intermediate position, the third abutment surface 34 is brought into abutment against the hinge main body 5 as shown in FIG. 6. As a result, the reception case 3 cannot turn any further toward the transmission position with respect to the hinge main body 5. Therefore, if an attempt is made to turn the reception case 3 further toward the transmission position from the intermediate position, the hinge main body 5 begins to turn from the initial position toward the terminal position in the direction indicated by arrow B (one direction) with respect to the transmission case 2. Then, as shown in FIG. 7, when the hinge main body 5 is turned to the terminal position in the direction indicated by arrow B, the hinge main body 5 is abutted against the second abutment surface 25 and stopped. Thus, the reception case 3 is also stopped. At this time, the reception case 3 already turns with respect to the transmission case 2 by a portion equivalent to the sum of its own turn from the folded position to the intermediate position and the turn of the hinge main body 5 from the initial position to the terminal position and already reaches the transmission position.

In case the reception case 3 is to be turned from the transmission position to the folded position, the reception case 3 is pushed in the direction indicated by arrow C (closing direction). Then, the hinge main body 5 is turned from the terminal position toward the initial position in the direction indicated by arrow A (the other direction) about the first turning axis L1, with respect to the transmission case 2. At that time, the reception case 3 is not turned with respect to the hinge main body 5 but it is turned about the first turning axis L1 in unison with the hinge body 5. Accordingly, when the hinge main body 5 reaches the initial position shown in FIG. 6, the reception case 3 reaches the intermediate position. When the hinge main body 5 reaches the initial position, it is abutted against the first abutment surface 24. Accordingly, the hinge main body 5 is stopped. Thereafter, when the reception case 3 is pushed further toward the folded position from the intermediate position in a direction indicated by arrow C, the reception case 3 is turned in the direction indicated by arrow C about the second turning axis L2 with respect to the hinge main body 5, because the hinge main body 5 is stopped. When the reception case 3 is turned into the folded position, it is abutted against the transmission case 2 and stopped.

Next, first hinges 6A, 6B and second hinges 7A, 7B will be described, which act with the first through third abutment surfaces 24, 25, 34 to turn the reception case 3 and the hinge main body 5 in the above-mentioned order. The first hinges 6A, 6B are laterally symmetrically constituted, and the second hinges 7A, 7B are also laterally symmetrically constituted. Moreover, the first hinge 6A and the second hinge 7A are same in basic constitution, excepting only a part of constitution. Accordingly, the first hinge 6A will be described first, and then, the second hinge 7A will be described only with respect to points that are different from the first hinge 6A. Description of the first hinge 6B and the second hinge 7B is omitted.

Figure 8:
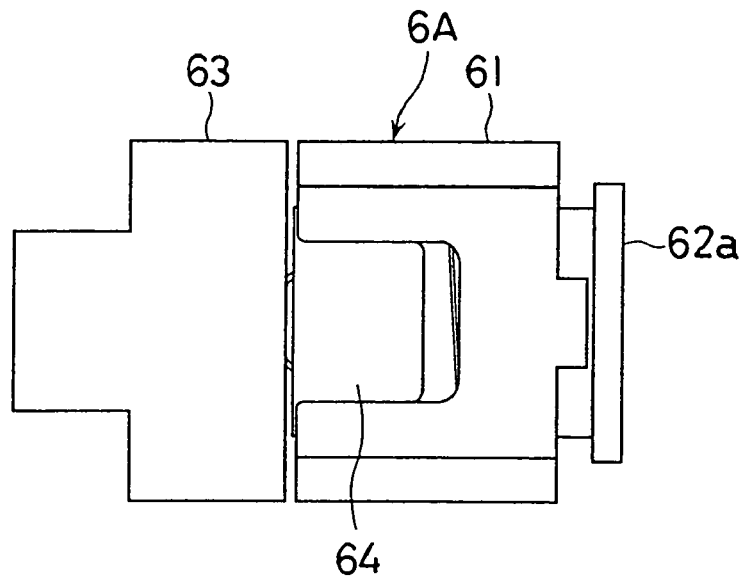
FIG. 8 is a front view showing a first hinge that is employed in the first embodiment.
Figure 9:
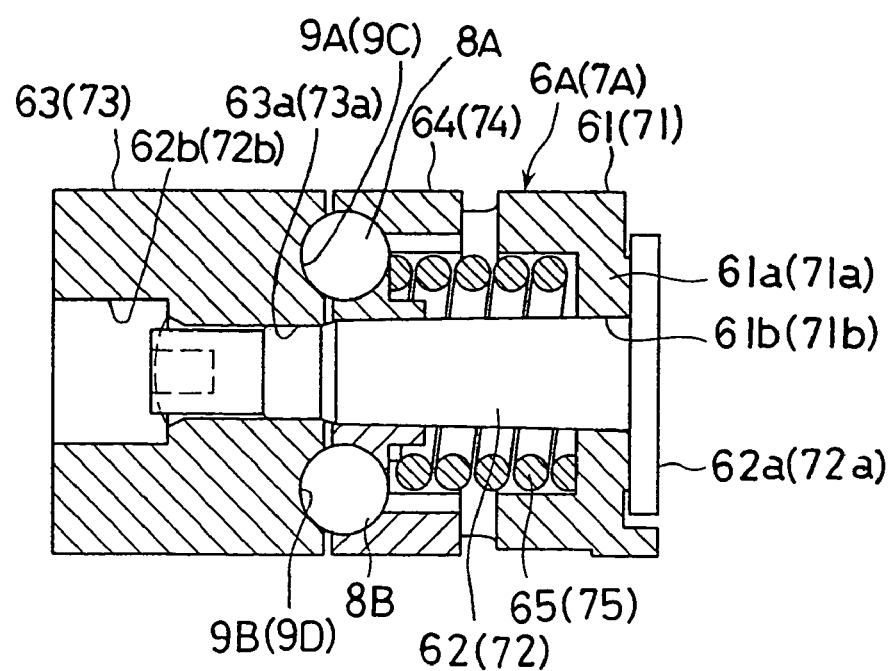
FIG. 9 is a cross sectional view of the first hinge.
Figure 10:
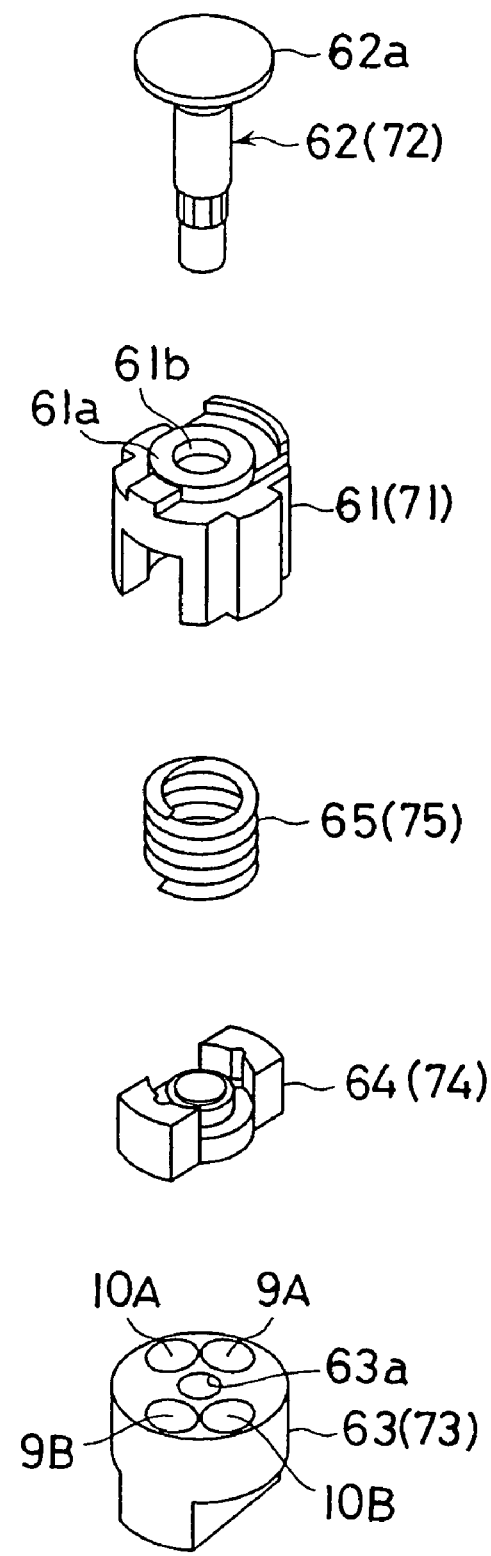
FIG. 10 is an exploded perspective view of the first hinge.

As shown in FIGS. 8 through 10, the first hinge 6A includes a first fixing member 61, a first hinge shaft 62, a first turnable member 63, a first movable member 64, and a first coiled spring (first biasing means) 65.

The first fixing member 61 has a circular cylindrical configuration and includes a bottom part 61a at one end part thereof. Through-hole 61b is formed in a central part of the bottom part 61a. The first hinge shaft 62 is turnably passed through this through-hole 61b. A head part 62a is formed on one end part of the first hinge shaft 62. Abutment of the bottom part 61a against this head part 62a prohibits the first fixing member 61 from escaping through one end part of the first hinge shaft 62.

The first turnable member 63 has a solid short circular columnar configuration and is arranged opposing the first fixing member 61. On the axis of the first turnable member 63, a reduced-diameter hole part 63a is formed in the end part on the first fixing member 61 side, and an enlarged-diameter hole part 63b is formed in the reverse side end part. The other end part of the first hinge shaft 62 is non-turnably press-fitted in the reduced-diameter hole part 63a. Due to this arrangement, the first turnable member 63 is turnably connected to the first fixing member 61 through the first hinge shaft 62. The first turnable member 63 may be designed in such a manner as to be able to be turned with respect to the first hinge shaft 62. In this case, the first fixing member 61 may be designed in such a manner as to be non-turnable with respect to the first hinge shaft 62. The other end part of the first hinge shaft 62 is passed through the reduced-diameter hole part 63a and allowed to project slightly toward the enlarged-diameter hole part 63b. By caulking this projected part of the first hinge shaft 62 in a manner represented by an imaginary line in FIG. 9, the first turnable member 63 is prohibited from escaping through the other end part of the first hinge shaft 62.

The first movable member 64 is fitted to the central part of the first hinge shaft 62 located between the first fixing member 61 and the second turnable member 63 in such a manner as to be turnable, and slideable in the axial direction of the first hinge shaft 62. The first movable member 64 is connected to the first fixing member 61 in such a manner as to be non-turnable, but movable in the axial direction of the first hinge shaft 62. The first coiled spring 65 is arranged between the first movable member 64 and the bottom part 61a of the first fixing member 61. By the coiled spring 65, the first movable member 64 is biased toward the first turnable member 63.

As shown in FIG. 4, the first hinge 6A is arranged with its axis aligned with the first turning axis L1. The first fixing member 61 is non-turnably fitted to a support hole 51 which is formed on an end face of the hinge main body 5 with its axis aligned with the first turning axis L1. One end part of the first turnable member 63 is non-turnably fitted to a support hole 26 formed on the first turning axis L1 of the transmission case 2, and the other end part is turnably fitted to the support hole 51. Due to this arrangement, the transmission case 2 and the hinge main body 5 are turnably connected to each other through the first hinge 6A, and particularly about the first turning axis L1. When the hinge main body 5 is turned with respect to the transmission case 2, the first fixing member 61 and the first movable member 64 are turned in unison with respect to the transmission case 2 and the first turnable member 63.

Figure 15:
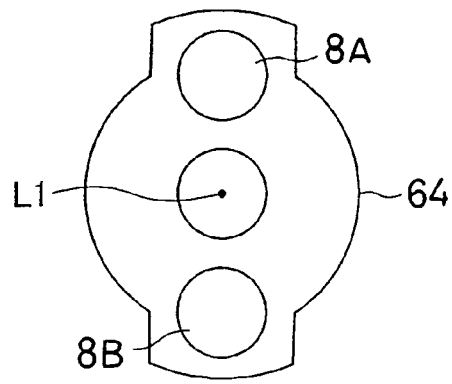
FIG. 15 is a plan view showing a first movable member of the first hinge which is employed in the first embodiment.

As shown in FIGS. 9 and 15, a pair of spherical bodies 8A, 8B are fixedly embedded in the confronting surface of the first turnable member 63 of the first movable member 64, projected toward the second turnable member 63. The pair of spherical bodies 8A, 8B are symmetrically arranged with respect to the first turning axis L1. That is, the pair of spherical bodies 8A, 8B are arranged on a circumference about the first turning axis L1 in such a manner as to be 180 degrees away from each other in the peripheral direction. The pair of spherical bodies 8A, 8B are pushed against the confronting surface of the first movable member 64 of the first turnable member 63 by the first coiled spring 65.

Figure 11:
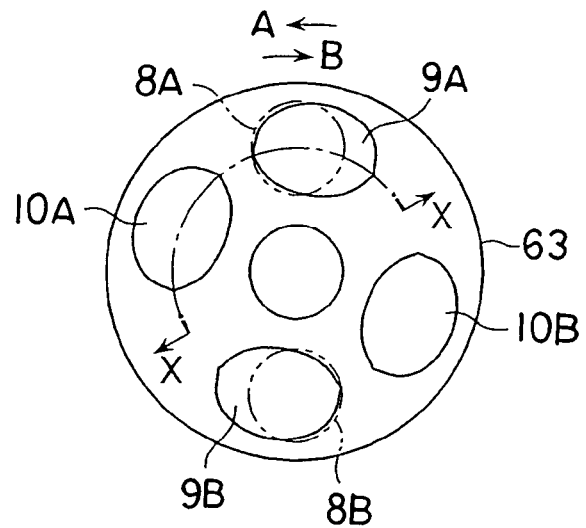
FIG. 11 is a plan view showing a first turnable member of the first hinge.

On the other hand, a pair of recesses 9A, 9B and another pair of recesses 10A, 10B are, as shown in FIG. 11, formed on the confronting surface with the first movable member 64 of the first turnable member 63. The recesses 9A, 9B, 10A, 10B are arranged on the same circumference as the circumference on which the spherical bodies 8A, 8B are arranged. Moreover, the pair of recesses 9A, 9B are arranged 180 degrees away from each other in the peripheral direction, and the other pair of recesses 10A, 10B are also arranged 180 degrees away from each other in the peripheral direction.

The pair of recesses 9A, 9B and the other pair of recesses 10A, 10B are arranged in such a manner as to have the following relationship with the spherical bodies 8A, 8B. That is, the pair of recesses 9A, 9B are arranged such that when the hinge main body 5 is turned to an initial nearby position which is located before the initial position by a predetermined angle (for example, 10 to 15 degrees), in case the hinge main body 5 is turned toward the initial position from the terminal position in the direction indicated by arrow A of FIG. 5 and in association therewith, the spherical bodies 8A, 8B are turned in the direction indicated by arrow A of FIG. 11 with respect to the first turnable member 63. The spherical bodies 8A, 8B begin to enter the pair of recesses 9A, 9B, respectively, and the spherical bodies 8A, 8B are press contacted respectively with inclination surfaces 91, 91 (see FIG. 12), which are formed in the respective bottom surfaces of the recesses 9A, 9B. Moreover, the pair of recesses 9A, 9B are arranged such that the spherical bodies 8A, 8B are slidingly moved on the inclination surfaces 91, 91 in the peripheral direction toward the centers of the recesses 9A, 9B until the hinge main body 5 reaches the initial position from the initial nearby position.

When the spherical bodies 8A, 8B are in contact with the inclination surfaces 91, 91 of the recesses 9A, 9B, the biasing force of the first coiled spring 65 is converted to a turn biasing force about the first turning axis L1 by the inclination surfaces 91, 91 and also by the spherical bodies 8A, 8B, which are in contact with the inclinations surfaces 91, 91. By this turn biasing force, the spherical bodies 8A, 8B are turn biased in the direction indicated by arrow A of FIG. 11, and the hinge main body 5 is turn biased in the direction indicated by arrow A of FIGS. 5 through 7. Therefore, when the hinge main body 5 is located between the initial position and the initial nearby position, the hinge main body 5 is automatically turned to the initial position and held in that position by the turn biasing force of the first coiled spring 65, which has been converted by the inclination surfaces 91, 91 and the spherical bodies 8A, 8B. As is apparent from this, a first conversion means 11 adapted to convert the biasing force of the first coiled spring 65 into the turn biasing force is constituted by the inclination surfaces 91, 91 and the spherical bodies 8A, 8B, and a first turn biasing means (first turn prohibition means) 12 adapted to turn bias the hinge main body 5 toward the terminal position from the initial position is constituted by the first conversion means 11 and the first coiled spring 65. The first turn biasing means 12 is adapted to prohibit the hinge main body 5 from turning toward the terminal position from the initial position.

Figure 12:
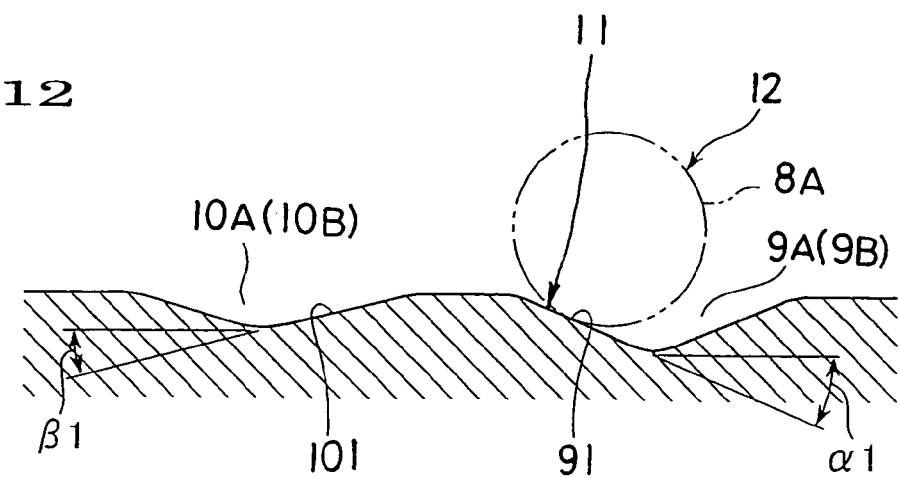
FIG. 12 is an enlarged cross sectional view taken on line X-X of FIG. 11.

The pair of recesses 10A, 10B are arranged such that when the hinge main body 5 is turned to a near terminal position which is located before the terminal position by a predetermined angle (for example, 10 to 15 degrees) in case the hinge main body 5 is turned toward the terminal position from the initial position in the direction indicated by arrow B of FIG. 7, and in accompaniment therewith, the spherical bodies 8A, 8B are turned in the direction indicated by arrow B of FIG. 11 with respect to the first turnable member 63, the spherical bodies 8A, 8B begin to enter the pair of recesses 10A, 10B, respectively. The spherical bodies 8A, 8B, when entered in the recesses 10A, 10B, are press contacted respectively with inclination surfaces 101, 101 which are formed in the respective bottom surfaces of the recesses 10A, 10B as shown in FIG. 12. Moreover, the pair of recesses 10A, 10B are arranged such that the spherical bodies 8A, 8B are slidingly moved on the inclination surfaces 101, 101 in the peripheral direction toward the centers of the recesses 10A, 10B until the hinge main body 5 reaches the terminal position from the near terminal position.

When the spherical bodies 8A, 8B are in contact with the inclination surfaces 101, 101 of the recesses 10A, 10B, the biasing force of the first coiled spring 65 is converted to a turn biasing force about the first turning axis L1 by the inclination surfaces 101, 101 and also by the spherical bodies 8A, 8B, which are in contact with the inclinations surfaces 101, 101. By this turn biasing force, the spherical bodies 8A, 8B are turn biased in the direction indicated by arrow B of FIG. 11, and the hinge main body 5 is turn biased in the direction ad indicated by the arrow B of FIGS. 5 through 7. Therefore, when the hinge main body 5 is located between the terminal position and the near terminal position, the hinge main body 5 is automatically turned to the terminal position and held in that position by the turn biasing force of the first coiled spring 65, which has been converted by the inclination surfaces 101, 101 and the spherical bodies 8A, 8B. As apparent from this, a second conversion means 13 adapted to convert the biasing force of the first coiled spring 65 into the turn biasing force is constituted by the inclination surfaces 101, 101 and the spherical bodies 8A, 8B, and a second turn biasing means (second turn prohibition means) 14 adapted to turn bias the hinge main body 5 toward the terminal position from the initial position is constituted by the second conversion means 13 and the first coiled spring 65. The second turn biasing means 14 is adapted to prohibit the hinge main body 5 from turning toward the initial position from the terminal position.

Next, the second hinge 7A will be described. The above-mentioned basic construction concerning the first hinge A is likewise applicable to the second hinge A. Therefore, the second hinge 7A includes, as shown in FIGS. 9 and 10, a second fixing member 71, a second hinge shaft 72, a second turnable member 73, a second movable member 74 and a second coiled spring (second biasing means) as component members corresponding respectively to the first fixing member 61, the first hinge shaft 62, the first turnable member 63, the first movable member 64 and the first coiled spring 65 of the first hinge 6A.

The second hinge 7A is arranged with the axis of the second hinge shaft 72 aligned with a second turning axis L2. The second fixing member 71 is non-turnably fitted to a support hole 52 which is formed on an end face of the hinge main body 5 such that the axis of the support hole 52 is aligned with the second turning axis. The second turnable member 73 is non-turnably fitted at one end part thereof to a support hole 37 which is formed on the second turning axis L2 of the reception case 3 and turnably fitted at the other end part to the support hole 52. Due to this arrangement, the reception case 3 is turnably connected to the hinge main body 5 through the second hinge 7A such that said reception case 3 is turnable about the second turning axis L2. When the second turnable member 73 is turned with respect to the hinge main body 5, the second turnable member 73 is turned in unison with the reception case 3 with respect to the hinge main body 5, the second fixing member 71 and the second movable member 74.

Figure 13:
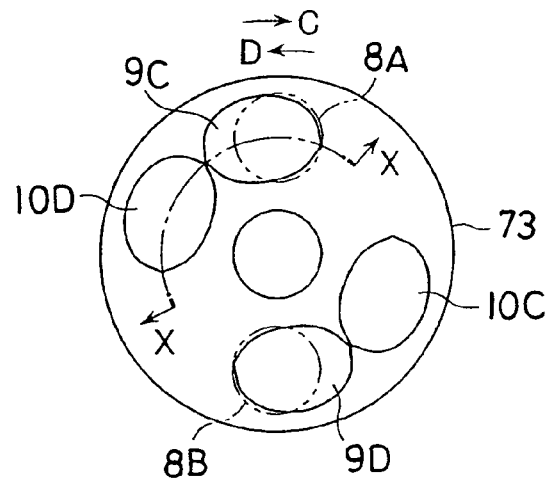
FIG. 13 is a plan view showing a second turnable member of a second hinge which is employed in the first embodiment.

Unlike the recesses 9A, 9B, 10A, 10B, recesses 9C, 9D, 10C, 10D are formed on the confronting surface of the second turnable member 73 with respect to the second movable member 74, as shown in FIG. 13. The recesses 9C, 9D, 10C, 10D are different in arrangement in the peripheral direction from the 9A, 9B, 10A, 10B.

Figure 14:
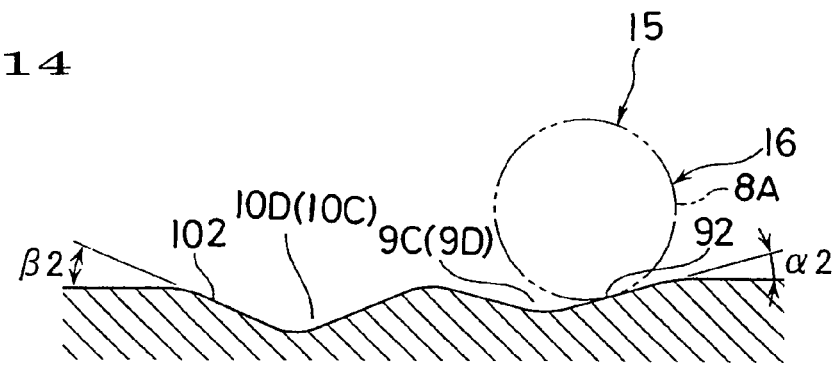
FIG. 14 is an enlarged cross sectional view taken on line X-X of FIG. 13.

Specifically, one pair of recesses 9C, 9D are arranged such that when the reception case 3 is turned to a near folded position which is located before the folded position by a predetermined angle (for example, 10 to 15 degrees) in case the reception case 3 is turned toward the folded position from the intermediate position in the direction indicated by arrow C of FIGS. 5 through 7 (at this time, the hinge main body 5 is stopped in the initial position), the spherical bodies 8A, 8B are entered respectively into the recesses 9C, 9D. The spherical bodies 8A, 8B entered respectively into the recesses 9C, 9D are press contacted respectively with inclination surfaces 92, 92, which are formed on the bottom surfaces of the recesses 9C, 9D, as shown in FIG. 14. Moreover, the one pair of recesses 9C, 9D are arranged such that the spherical bodies 8A, 8B are slidingly moved on the inclination surfaces 92, 92 toward the centers of the recesses 9C, 9D in the peripheral direction until the reception case 3 reaches the folded position from the near folded position.

When the spherical bodies 8A, 8B are in contact with the inclination surfaces 92, 92 of the recesses 9C, 9D, the biasing force of the second coiled spring 75 is converted into a turn biasing force about the second turning axis L2 by the inclination surfaces 92, 92 and by the spherical bodies 8A, 8B, which are in contact with the inclination surfaces 92, 92. By this turn biasing force, the second turnable member 73 is turn biased in the direction indicated by arrow C of FIG. 13, and thus, the reception case 3 is turn biased in the direction as indicated by the arrow C of FIGS. 5 through 7. Therefore, when located between the folded position and the near folded position, the reception case 3 is automatically turned to the folded position by the turn biasing force of the second coiled spring 75, which has been converted by the inclination surfaces 92, 92 and by the spherical bodies 8A, 8B, and held in that folded position. As apparent from this, a third conversion means 15 adapted to convert the biasing force of the second coiled spring 75 into a turn biasing force is constituted by the inclination surfaces 92, 92 and the spherical bodies 8A, 8B, and a third turn biasing means (third turn prohibition means) 16 adapted to turn bias the reception case 3 toward the folded position from the intermediate position through the third conversion means 15 and the second coiled spring 75. The third turn biasing means 16 prohibits the reception case 3 from turning toward the transmission position (developing position) by its turn biasing force.

The other pair of recesses 10C, 10D are arranged such that when the reception case 3 is turned to an near intermediate position which is located before the intermediate position by a predetermined angle (for example, 10 to 15 degrees), in case the reception case 3 is turned toward the intermediate position from the folded position in the direction as indicated by the arrow D of FIGS. 5 through 7 (at that time, the hinge main body 5 is stopped in the initial position), the spherical bodies 8A, 8B are entered into the recesses 10C, 10D, respectively. The spherical bodies 8A, 8B entered into the recesses 10C, 10D are press contacted respectively with inclination surfaces 102, 102 which are formed on the bottom surfaces of the recesses 10C, 10D, as shown in FIG. 14. Moreover, the one pair of recesses 10C, 10D are arranged such that the spherical bodies 8A, 8B are slidingly moved on the inclination surfaces 102, 102 toward the centers of the recesses 10C, 10D in the peripheral direction until the reception case 3 reaches the intermediate position from the intermediate nearly position.

When the spherical bodies 8A, 8B are in contact with the inclination surfaces 102, 102 of the recesses 10C, 10D, the biasing force of the second coiled spring 75 is converted into a turn biasing force about the second turning axis L2 by the inclination surfaces 102, 102 and by the spherical bodies 8A, 8B which are in contact with the inclination surfaces 102, 102. By this turn biasing force, the second turnable member 73 is turn biased in the direction indicated by arrow D of FIG. 13, and thus, the reception case 3 is turn biased in the direction indicated by arrow D of FIGS. 5 through 7. Therefore, when locating between the intermediate position and the near intermediate position, the reception case 3 is automatically turned to the intermediate position by the turn biasing force of the second coiled spring 75, which has been converted by the inclination surfaces 101, 102 and the spherical bodies 8A, 8B, and held in that intermediate position. As is apparent from this discussion, a fourth conversion means 17 adapted to convert the biasing force of the second coiled spring 75 into a turn biasing force is constituted by the inclination surfaces 102, 102 and the spherical bodies 8A, 8B, and a fourth turn biasing means (fourth turn prohibition means) 18 adapted to turn bias the reception case 3 toward the intermediate position from the folded position is constituted by the fourth conversion means 17 and the second coiled spring 75. The fourth turn prohibition means 18 prohibits the reception case 3 from turning toward the folded position from the intermediate position by its turn biasing force.

The angles of inclination of the inclination surfaces 91, 101 with respect to a plane orthogonal to the first turning axis L1 are, as shown in FIG. 12, set to be angles $\alpha 1$ and $\beta 1$, respectively. The angles of inclination of the inclination surfaces 92, 102 with respect to a plane orthogonal to the second turning axis L2 are, as shown in FIG. 14, set to be angles $\alpha 2$ and $\beta 2$, respectively. The angle $\alpha 1$ is set to be larger than the angle $\alpha 2$, and the angle $\beta 2$ is set to be larger than $\beta 1$. Therefore, the turn biasing force of the first turn biasing means 12 is set to be larger than the turn biasing force of the third turn biasing means 16, and the turn biasing force of the fourth turn biasing means 18 is set to be larger than the turn biasing force of the second turn biasing means 14.

Although $\alpha 1 = \beta 2$ and $\alpha 2 = \beta 1$ in this embodiment, the relationship of size between the angle $\alpha 1$ and the angle $\beta 2$, and the relationship of size between the angle $\alpha 2$ and the angle $\beta 1$ may be optionally set as long as the turn biasing force of the fourth turn biasing means 18 is set to be larger than the turn biasing force of the second turn biasing means 14.

In the portable cellular telephone set 1 having the above-mentioned construction, it is presumed that as shown in FIG. 5, the hinge main body 5 is located in the initial position and the reception case 3 is located in the folded position. In that state, as shown in FIG. 16(A), the spherical bodies 8A, 8B of the first hinge 6A are entered in the recesses 9A, 9B, respectively and the spherical bodies 8A, 8B of the second hinge 7A are entered in the recesses 9C, 9D, respectively.

When an attempt is made to turn the reception case 3 toward the transmission position, the hinge main body 5 is held in the stopped state in the initial position because the turn biasing force of the first turn biasing means 12 is larger than the turn biasing force of the third turn biasing means 16, and the reception case 3 is turned first in the direction of the arrow D of FIG. 5 about the second turning axis L2. That is, the reception case 3 is turned toward the intermediate position with respect to the hinge main body 5. During the time the reception case 3 is turned from the folded position to the near folded position, the reception case 3 is turned against the turn biasing force of the third turn biasing means 16. When the reception case 3 is located between the near folded position and the near intermediate position, the spherical bodies 8A, 8B are slidingly moved on the confronting surface of the second turnable member 73 with respect to the second movable member 74 and a frictional resistance is generated therebetween. Therefore, the reception case 3 is turned against the frictional resistance. Of course, since this frictional resistance is smaller than the turn biasing force of the first turn biasing means 12, the hinge main body 5 is held in its stopped state in the initial position.

When the reception case 3 reaches the near intermediate position, as shown in FIG. 16(B), the spherical bodies 8A, 8B of the second hinge 7A are press contacted with the inclination surfaces 102, 102 of the recesses 10C, 10D, respectively, and as a result, the reception case 3 is automatically turned to the intermediate position by the turn biasing force of the fourth turn biasing means 18. When the reception case 3 is turned to the intermediate position, the third abutment surface 34 is abutted against the hinge main body as shown in FIG. 6. This makes it impossible for the reception case 3 to turn toward the intermediate position from the folded position with respect to the hinge main body 5 and thus, the reception case 3 is stopped with respect to the hinge main body 5.

When an attempt is made to turn the reception case 3 further toward the transmission position from the intermediate position, the hinge main body 5 begins to turn toward the terminal position from the initial position about the first turning axis L1 because the reception case 3 is non-turnable with respect to the hinge main body 5 and in accompaniment therewith, the reception case 3 is continuously turned toward the transmission position. During the time the hinge main body 5 is turned from the initial position to the initial nearby position (during the time the reception case 3 is turned by a predetermined angle toward the transmission position from the intermediate position), the hinge main body 5 is turned against the biasing force of the first turn biasing means 12. When the hinge main body 5 is located between the initial nearby position and the near terminal position, the spherical bodies 8A, 8B are slidingly moved on the confronting surface of the first turnable member 63 with respect to the first movable member 64 and a frictional resistance is generated therebetween. Therefore, the hinge main body 5 is turned against this frictional resistance.

When the hinge main body 5 reaches the near terminal position, as shown in FIG. 16(C), the spherical bodies 8A, 8B of the first hinge 6A are press contacted with the inclination surfaces 101, 101 of the recesses 10A, 10B, respectively, and as a result, the hinge main body 5 is automatically turned to the terminal position by the turn biasing force of the second turn biasing means 14. When the hinge main body 5 reaches the terminal position, as shown in FIG. 7, the hinge main body 5 is abutted against the second abutment surface 25 and stopped. At that time, the reception case 3, which has been turned in unison with the hinge main body 5, already reaches the transmission position. The reception case 3 is held in the transmission position by the turn biasing force of the second turn biasing means 14.

In the state of FIG. 7 where the hinge main body 5 is located in the terminal position and the reception case 3 is located in the transmission position, when it is attempted to turn the reception case 3 toward the folded position, the reception case 3 is held in its stopped state with respect to the hinge main body 5 because the turn biasing force of the fourth turn biasing means 18 is larger than the turn biasing force of the second turn biasing means 14, and the hinge main body 5 is turned toward the initial position from the terminal position about the first turning axis L1. Of course, the reception case 3 is turned toward the folded position from the transmission position with respect to the transmission case 2 in accordance with the turn of the hinge main body 5. During the time the hinge main body 5 is turned from the terminal position to the near terminal position, the hinge main body 5 is turned against the turn biasing force of the second turn biasing means 14. When located between the near terminal position and the initial nearby position, the hinge main body 5 is turned against the frictional resistance generated between the spherical bodies 8A, 8B and the first turnable member 63. Since this frictional resistance is smaller than the turn biasing force of the fourth turn biasing means 18, the reception case 3 is not turned with respect to the hinge main body 5.

When the hinge main body 5 reaches the initial nearby position, the spherical bodies 8A, 8B are press contacted with the inclination surfaces 91, 91, respectively and as a result, the hinge main body 5 is automatically turned to the initial position by the turn biasing force of the first turn biasing means 12. Then, as shown in FIG. 6, the hinge main body 5 is abutted against the first abutment surface 24 and stopped. At this time, the reception case 3, which has been turned in unison with the hinge main body 5, has already reached the intermediate position.

When it is attempted to turn the reception case 3 toward the folded position from the intermediate position, only the reception case 3 is turned toward the folded position from the intermediate position because the hinge main body 5 is stopped in the initial position. During the time the reception case 3 is turned to the near intermediate position from the intermediate position, the reception case 3 is turned against the turn biasing force of the fourth turn biasing means 18. When located between the near intermediate position and the near folded position, the reception case 3 is turned against the frictional resistance generated between the spherical bodies 8A, 8B and the second turnable member 73. When the reception case 3 reaches the near folded position, the spherical bodies 8A, 8B are press contacted with the inclination surfaces 92, 92, respectively, and as a result, the reception case 3 is automatically turned to the folded position by the turn biasing force of the third turn biasing means 16 and held in the folded position. By this, the portable cellular telephone set 1 is returned to the original state of FIG. 5.

As seen, since the turning sequential order of the reception case 3 and the hinge main body 5 in the portable cellular telephone set 1 is predetermined, it never becomes necessary to change the acting direction of the force acting on the reception case 3 in the midway of the turning operation of the reception case 3, and the user will not have an uneasy feeling.

Figure 17A:
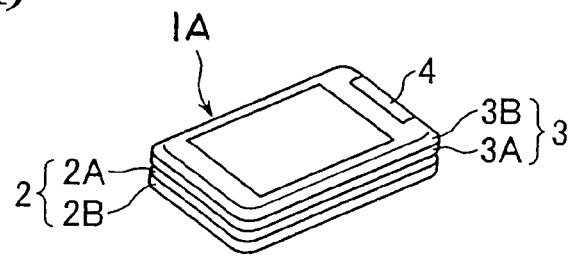
FIG. 17(A) is a perspective view showing a portable cellular telephone set as a second embodiment for carrying out the first aspect of the present invention, in which a reception case is located in a folded position.
Figure 17B:
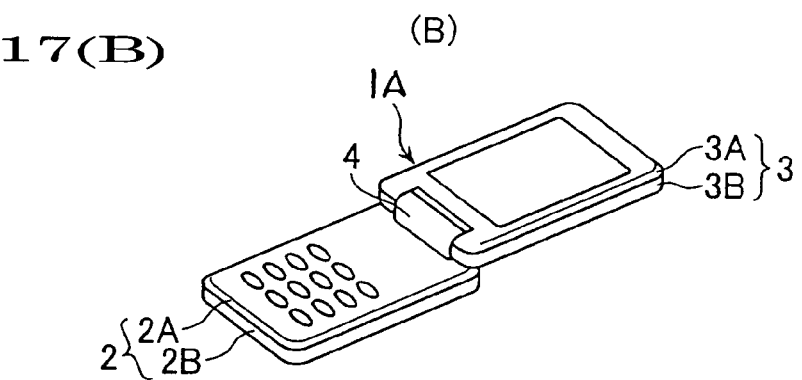
FIG. 17(B) is the same view as FIG. 17(A), but in which the reception case is located in an intermediate position.
Figure 17C:
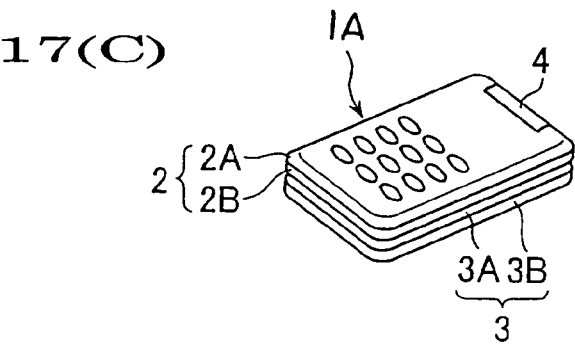
FIG. 17(C) is the same view as FIG. 17(A), but in which the reception case is located in a transmission position.
Figure 19:
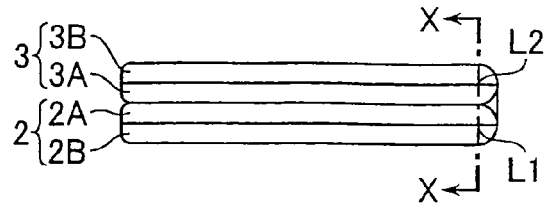
FIG. 19 is a side view of the second embodiment.
Figure 20:
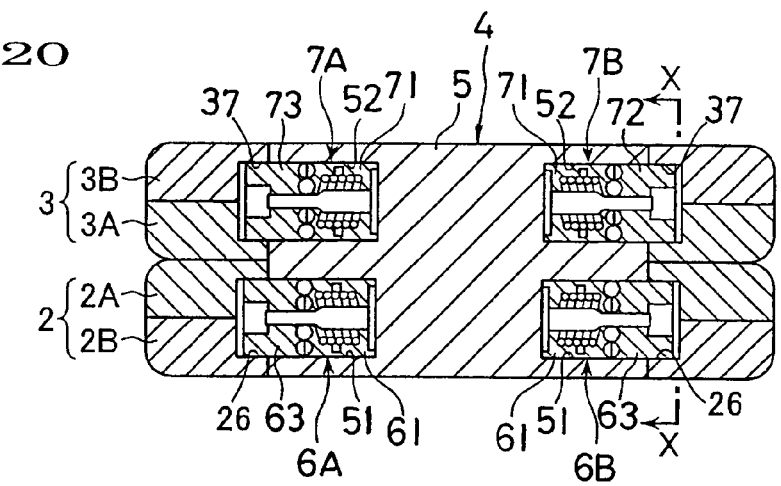
FIG. 20 is an enlarged cross sectional view taken on line X-X of FIG. 19.

Next, a second embodiment according to the first mode of the present invention shown in FIGS. 17 through 26 will be described. In a portable cellular telephone set 1A according to this embodiment, as shown in FIGS. 17(A) through 17(C), the reception case 3 is turned about 360 degrees with respect to the transmission case 2 through the hinge main body 5, and the position where the reception case 3 is turned about 180 degrees from the folded position is the intermediate position. In order to make it possible to turn the reception case 3 by 360 degrees, a cutout part 28 instead of the recess 21 is formed on the lower case half body 2B of the transmission case 2 and a cutout part 35 instead of the recess 31 is formed on the upper case half body 3B of the reception case 3. As shown in FIG. 19, the first and second turning axes L1, L2 are arranged in the same position in the longitudinal direction of the transmission case 2 and the reception case 3.

Figure 21:
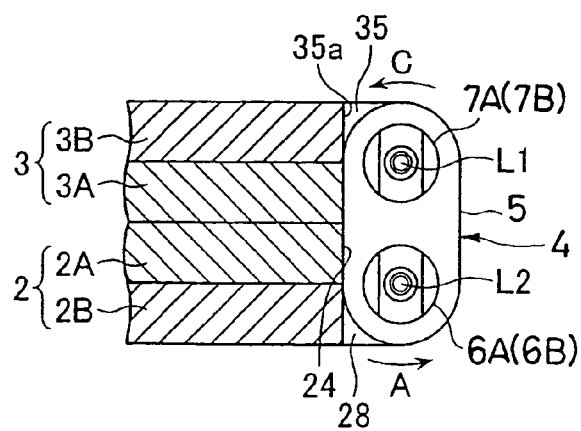
FIG. 21 is an enlarged cross sectional view, partly omitted, taken on line X-X of FIG. 20, but in which the reception case is located in a folded position.
Figure 22:
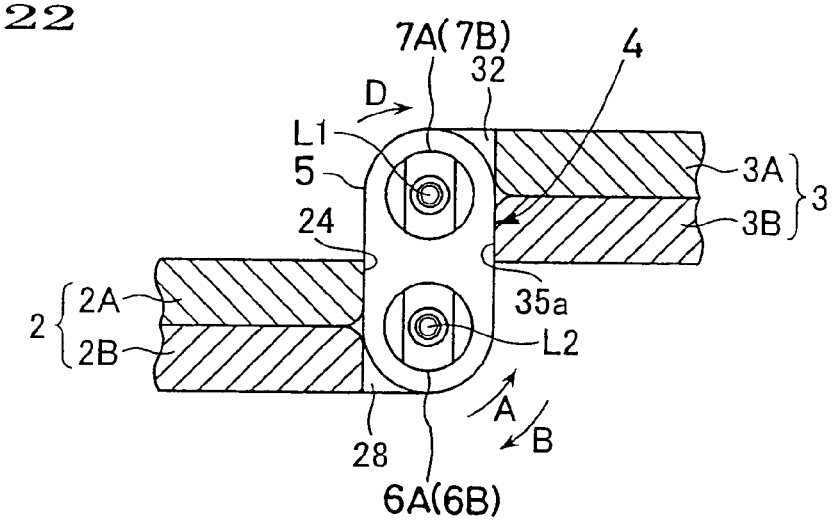
FIG. 22 is a cross sectional view, like FIG. 21, but in which the reception case is located in the intermediate position.
Figure 23:
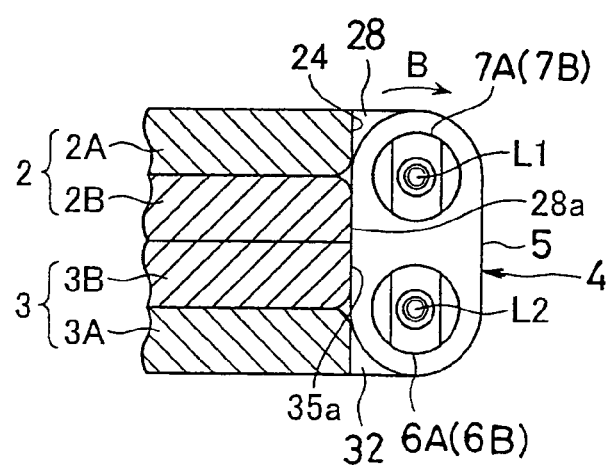
FIG. 23 is a cross sectional view, like FIG. 21, but in which the reception case is located in the transmission position.

As shown in FIG. 21, the folded position of the reception case 3 is restricted by abutment of the reception case 3 against the transmission case 2, and the initial position of the hinge main body 5 is restricted by abutment of the hinge main body 4 against the first abutment surface 24 of the cutout 22. This is same as in the above-mentioned embodiment. However, as shown in FIG. 22, the intermediate position of the reception case 3 is restricted by abutment of a wall surface 35*a* (third stop means) extending in the short direction of the reception case 3 of the entire wall surface, which defines the cutout part 35 formed on the upper case half body 3B against the hinge main body 5. Also, as shown in FIG. 23, the terminal position (transmission position of the reception case 3) of the hinge main body 5 is restricted by abutment of the hinge main body 5 against a wall surface (second stop means) 28*a* extending in the short direction of the transmission case 2 of the entire wall surface which defines the cutout part 28 formed on the lower case half body 2B.

Figure 24:
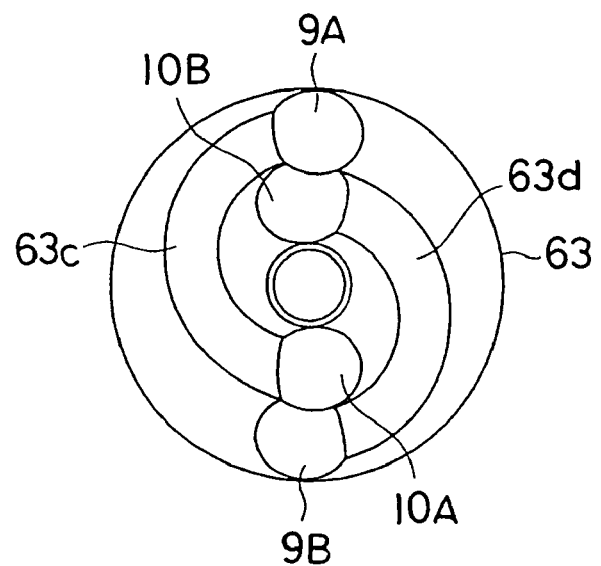
FIG. 24 is a plan view showing a first turnable member of a first hinge which is employed in the second embodiment.

In the first hinge 6A according to this embodiment, in order to make it possible to turn the hinge main body 5 by 180 degrees with respect to the transmission case 2, as shown in FIG. 24, a pair of recesses 9A, 9B are arranged 180 degrees away from each other in the peripheral direction on the confronting surface of the first turnable member 63 with the first movable member 64, and another pair of recesses 10A, 10B are arranged 180 degrees away from each other in the peripheral direction on the confronting surface of the first turnable member 63 with the first movable member 64. Moreover, the recesses 9A, 10B are arranged in the same position in the peripheral direction and the recesses 9B, 10A are arranged in the same position in the peripheral direction. In order to make such an arrangement possible, the recesses 9A, 9B are arranged on the outer periphery side, the recess 10B is arranged inside the recess 9A, and the recess 10A is arranged inside the recess 9A. Such an arrangement of the recesses 9A, 9B, 10A, 10B is same as in the second hinge 7A. That is, in this embodiment, the first turnable member 63 of the first hinge 6A and the second turnable member 73 of the second hinge 7A are constructed in the same manner. However, the first and second hinges 6A, 7A are, as later described, different in relationship than the recesses 9A, 9B, 10A, 10B and the spherical bodies 8A, 8B.

Figure 25:
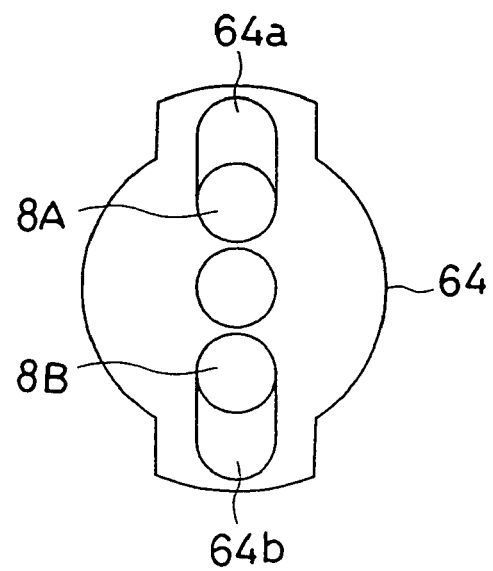
FIG. 25 is a plan view showing a first movable member of the first hinge which is used in the second embodiment.
Figure 27:
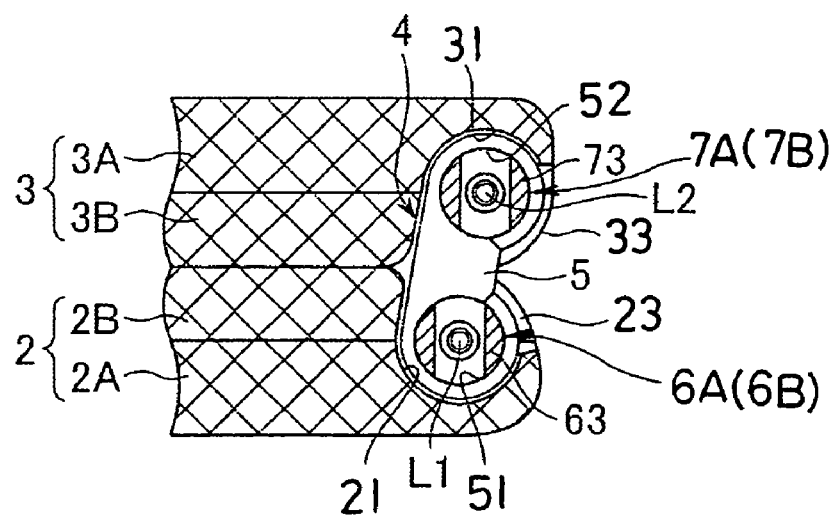
FIG. 27 is a cross sectional view, like FIG. 5, showing a first embodiment according to a second aspect of the present invention, in which a reception case is located in a folded position.
Figure 28:
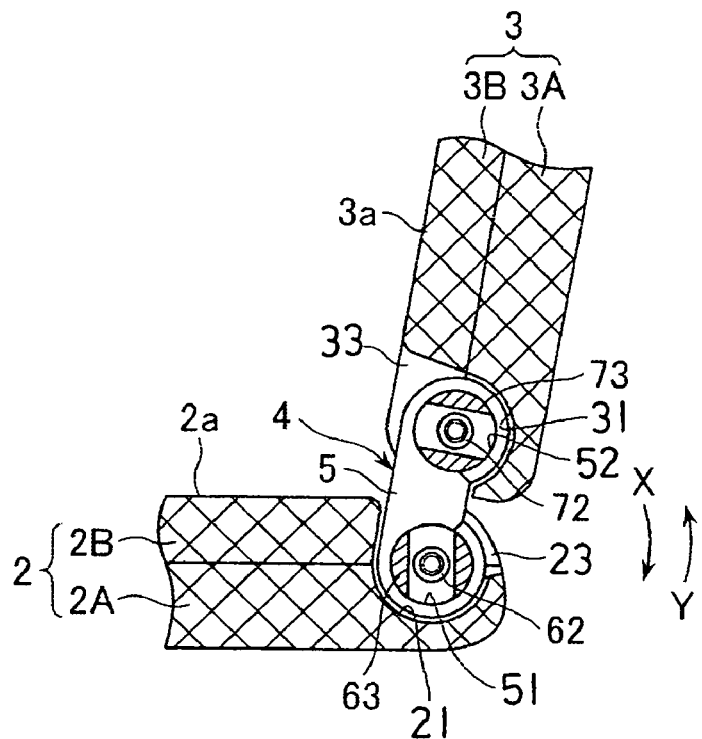
FIG. 28 is a cross sectional view, like FIG. 27, but in which the reception case is turned to an intermediate position.
Figure 29:
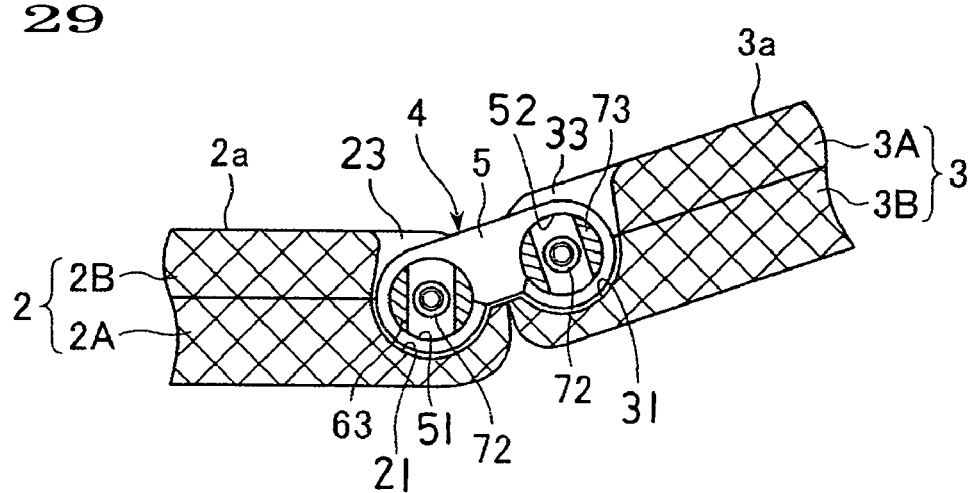
FIG. 29 is a cross sectional view, like FIG. 27, but in which the reception case is turned to a transmission position.

The recesses 9A, 10A are connected to each other through a guide groove 63c extending spirally, and the recesses 9B, 10B are connected to each other through a guide groove 63d extending spirally. Owing to this arrangement, the spherical bodies 8A, 8B can move between the recesses 9A, 10A and the recesses 9B, 10B, respectively. When the spherical bodies 8A, 8B are moved between the recesses 9A, 10A and the recesses 9B, 10B, respectively, the spherical bodies 8A, 8B are moved radially with respect to the first movable member 64 because the guide grooves 63c, 63d are spirally formed. In order to make it possible to move the spherical bodies 8A, 8B in the radial direction of the first movable member 64, as shown in FIG. 25, a pair of receiving recesses 64a, 64b extending radially are formed on the confronting surface of the first movable member 64 with the first turnable member 63, and the spherical bodies 8A, 8B are received respectively in the receiving recesses 64a, 64b, each with a part thereof projecting toward the first turnable member 63 from the receiving recesses 64a, 64b, respectively, such that the spherical bodies 8A, 8B are movable in the longitudinal direction of the receiving recesses 64a, 64b, respectively. Owing to this arrangement, the spherical body 8A can smoothly move between the recesses 9A, 10A, and the spherical body 8B can smoothly move between the recesses 9B, 10B. Of course, though not shown, a pair of similar receiving recesses are formed on the second movable member 74 of the second hinge 7A, and the spherical bodies 8A, 8B are movably received in the receiving recesses, respectively.

The relationship between the spherical bodies 8A, 8B and the recesses 9A, 9B, 10A, 10B will now be described. When the reception case 3 is located in the folded position and the hinge main body 5 is located in the initial position, as shown in FIG. 26(A), the spherical bodies 8A, 8B are entered in the recesses 9A, 9B, respectively, in the first hinge 6A and entered in the recesses 10A, 10B, respectively, in the second hinge 7A. As a result, the biasing force of the first coiled spring 65 is converted into a turn biasing force for turning the hinge main body 5 toward the initial position from the terminal position in one direction (the direction indicated by arrow A of FIG. 21) by the spherical bodies 8A, 8B and the inclination surfaces (not shown) formed on the bottom surfaces of the recesses 9A, 9B. As is apparent from this, the first conversion means 11 is constituted by the spherical bodies 8A, 8B and the inclination surfaces formed on the bottom surfaces of the recesses 9A, 9B, and the first turn biasing means (first turn prohibition means) 12 is constituted by the first conversion means 11 and the first coiled spring 65. On the other hand, the biasing force of the second coiled spring 75 is converted into a turn biasing force for turn biasing the reception case 3 toward the folded position from the intermediate position in the closing direction (the direction indicated by arrow C of FIG. 21) by the spherical bodies 8A, 8B and the inclination surfaces formed on the bottom surfaces of the recesses 10A, 10B. Thus, the third conversion means 15 is constituted by the spherical bodies 8A, 8B and the inclination surfaces formed on the bottom surfaces of the recesses 10A, 10B, and the third turn biasing means (third turn prohibition means) 16 is constituted by the third conversion means 15 and the second coiled spring 75. Of course, the turn biasing force of the first turn biasing means 12 is set to be larger than the turn biasing force of the third turn biasing means 16. Therefore, when the reception case 3 is turned toward the transmission position in a state where the reception case 3 is located in the folded position and the hinge main body 5 is located in the initial position, the hinge main body 5 is held in the stopped state in the initial position and only the reception case 3 is turned toward the developing position about the first turning axis L1.

When the reception case 3 is turned to the intermediate position from the folded position, as shown in FIG. 22, the wall surface 35a is abutted against the hinge main body 5 thus making it impossible for the reception case 3 to turn further toward the developing position (opening direction) from the folded position with respect to the hinge main body 5. When the reception case 3 is turned to the intermediate position, the spherical bodies 8A, 8B of the second hinge 7A are entered into the recesses 9A, 9B, respectively, as shown in FIG. 26(B). As a result, the biasing force of the second coiled spring 75 is converted into a turn biasing force for turn biasing the reception case 3 toward the intermediate position from the folded position in the opening direction (the direction indicated by arrow D of FIG. 22) by the spherical bodies 8A, 8B and the inclination surfaces formed on the bottom surfaces of the recesses 9A, 9B. Thus, the fourth conversion means 17 is constituted by the spherical bodies 8A, 8B of the second hinge 7A and the inclination surfaces formed on the bottom surfaces of the recesses 9A, 9B, and the fourth turn biasing means (fourth turn prohibition means) 18 is constituted by the fourth conversion means 17 and the second coiled spring 75.

When it is attempted to turn the reception case 3 further toward the developing position from the intermediate position, the hinge main body 5 is turned toward the terminal position from the initial position in one direction (the direction indicated by arrow B of FIG. 22) about the first turning axis L1 because the reception case 3 is non-turnable with respect to the hinge main body 3. When turned to the terminal position, the hinge main body 5 is abutted against the wall surface 28a and stopped as shown in FIG. 23. At that time, since the reception case 3 is turned in unison with the hinge main body 5, the reception case 3 already reaches the developing position. When the hinge main body 5 is turned to the terminal position, the spherical bodies 8A, 8B of the first hinge 6A are entered in the recesses 10A, 10B, respectively, as shown in FIG. 26(C). As a result, the biasing force of the first coiled spring 65 is converted into a turn biasing force for turn biasing the hinge main body 5 toward the terminal position from the initial position in the other direction (the direction indicated by arrow B of FIG. 23) by the spherical bodies 8A, 8B and the inclination surfaces formed on the bottom surfaces of the recesses 10A, 10B. Thus, the second conversion means 13 is constituted by the spherical bodies 8A, 8B of the first hinge 6A and the inclination surfaces formed on the bottom surfaces of the recesses 10A, 10B, and the second turn biasing means (second turn prohibition means) 14 is constituted by the second conversion means 13 and the first coiled spring 65.

When it is attempted to turn the reception case 3 toward the folded position in a state where the reception case 3 is located in the developing position and the hinge main body 5 is located in the terminal position, the reception case 3 is held in the stopped state with respect to the reception case 3 since the turn biasing force of the second turn biasing means 14 is set to be larger than the turn biasing force of the second turn biasing means 14, and the hinge main body 5 is turned toward the initial position from the terminal position about the first turning axis L1. The hinge main body 5 is stopped when it is turned to the initial position. At this time, the reception case 3 turned in unison with the hinge main body 5, which has already reached the intermediate position. When the reception case 3 is turned toward the folded position from the intermediate position, only the reception case 3 is turned because the hinge main body 5 is the stopped state. The reception case 3 is turned until it is abutted against the transmission case 2 and stopped when it reaches the folded position.

The construction and operation of the portable cellular telephone set 1A other than those mentioned above are same as the construction and operation of the portable cellular telephone set 1. For example, when located between the folded position and the near folded position, the reception case 3 is automatically turned to the folded position by the third turn biasing means 13.

It should be noted, however, that the first mode of the present invention is not limited to the above-mentioned embodiments but it can be changed and/or modified according to necessity without departing from the subject matter of the present invention.

For example, in the above-mentioned embodiments, although the planes of the recesses 9A, 9B, 9C, 9D, 10A, 10B, 10C, 10D, which with the spherical bodies 8A, 8B are contacted, are inclination surfaces which are inclined at predetermined angles, the respective planes of the recesses 9A through 10D, with which the spherical bodies 8A, 8B are contacted, may be formed as surfaces which are different in inclination angles at each part of the surfaces, as long as the turn biasing force of the first turn biasing means 18 is set to be larger than the biasing force of the second turn biasing means 14.

Moreover, in the above-mentioned embodiments, although the recesses 9A through 10D are formed on the first and second turnable members 63, 73 and the spherical bodies 8A, 8B are provided on the first and second movable members 64, 74, respectively, it is also accepted that spherical bodies are provided on the first and second turnable members 63, 73 and recesses are formed on the first and second movable members 64, 74. Moreover, instead of the spherical bodies 8A, 8B, for example, semi-spherical projections may be formed on the first and second movable members 64, 74.

Furthermore, in the above-mentioned embodiments, in case the reception case 3 is to be turned in one direction from any one of the folded position, the intermediate position, or the developing position (transmission position), one of the reception case 3 and the hinge main body 5 is immediately turned in that direction. However, it is also accepted that after the other of the reception case 3 and the hinge main body 5 is turned in one direction only by an angle small enough not to give any sense of uncomfortability, the one of the reception case 3 and the hinge main body 5 is turned in that direction. For example, in case the reception case 3 is turned toward the folded position from the transmission position, when the reception case 3 is operated to turn, the hinge main body 5 is immediately turned toward the initial position from the terminal position according to the above-mentioned embodiments. However, it is also accepted that the hinge main body 5 is turned after the reception case 3 is turned toward the transmission position only if the angle is small. Such a turning operation as just mentioned can be obtained by employing the following construction.

That is, in the above-mentioned embodiments, although the transmission position is restricted by abutment of the third abutment surface 34 of the reception case 3 against the hinge main body 5, such restriction is canceled. Then, the reception case 3 is caused to turn toward the transmission position by entry of the spherical bodies 8A, 8B in the recesses 9A, 9B. Since there is no restriction caused by the third abutment surface 34, the reception case 3 is kept turned until the spherical bodies 8A, 8B are moved to the central parts (the deepest parts) of the bottom surfaces of the recesses 9A, 9B and stopped. The radii of curvature of the bottom surfaces of the central parts of the recesses 9A, 9B are set to be larger than the radii of the spherical bodies 8A, 8B. Due to this arrangement, when the reception case 3 is turned toward the folded position from the stopping position, the reception case 3 is turned with respect to the hinge main body 5 without turning the hinge main body 5 in such a small range of angles for allowing the spherical bodies 8A, 8B to contact the inclination surfaces 91 of the recesses 9A, 9B, respectively. Thereafter, when the spherical bodies 8A, 8B are contacted with the inclination surfaces 91, the fourth turn prohibition means 18 prohibits the turn of the reception case 3 with respect to the hinge main body 5. Therefore, afterwards, the hinge main body 5 is turned to the initial position from the terminal position in the same manner as in the case with the above-mentioned embodiments. Such a turning operation as just mentioned can be performed in the same manner not only when the reception case 3 is located in the transmission position (developing position) but also when the reception case 3 is located in the folded position or in the intermediate position.

Moreover, in the above-mentioned embodiments, because of such a structural feature that the transmission case 2 serves as a first case and the reception case 3 serves as the second case, the transmission case 2 is fixed and the reception case 3 is turned, and so, in case the reception case 3 serving as the second case is to be turned to the transmission position (developing position) from the folded position, the hinge main body 5 is turned with respect to the transmission case 2 after the second case 2 is turned with respect to the hinge main body 5, and in case the reception case 3 is to be turned to the folded position from the transmission position, the reception case 3 is turned with respect to the hinge main body 5 after the hinge main body 5 is turned with respect to the transmission case 2. It should be noted, however, that the transmission case 2 may serve as a reception case and the reception case 3 may serve as a transmission case. In other words, the transmission case 2 may serve as a second case and the reception case 3 may serve as a first case. In that case, the reception case 3 serving as a transmission case is fixed, and the transmission case 2 as a reception case is turned with respect to the reception case 3. When the transmission case 2 is to be turned to the transmission position from the folded position, first, the hinge main body 5 is turned with respect to the reception case 3, and thereafter, the transmission case 2 is turned with respect to the hinge main body 5. Similarly, when the transmission case 2 is to be turned to the folded position from the transmission position, first, the transmission case 2 is turned with respect to the hinge main body 5, and thereafter, the hinge main body 5 is turned with respect to the reception case 3. As is apparent from this, the turning order between the second case (reception case 3 or transmission case 2) and the hinge main body 5 becomes reverse depending on when the transmission case 2 serves as a first case and when the reception case 3 serves as a first case.

Next, one embodiment according to a second mode of the present invention will be described. In a portable cellular telephone set according to this embodiment, basic construction of the portable cellular telephone set and the basic construction of the first and second hinges 6A, 6B, 7A, 7B are same as those of the above-mentioned portable cellular telephone set. In the above-mentioned portable cellular telephone set 1, the folded position, the intermediate position and the transmission position of the reception case 3 and the initial position and the terminal position of the hinge main body 5 are restricted by abutment of the reception case 3 against the transmission case 2 or by abutment of the hinge main body 5 against the transmission case 2 or the reception case 3. On the other hand, in this embodiment, the positions of the reception case 3 and the hinge main body 5 are restricted by the first and second hinges 6A, 6B, 7A, 7B, respectively. Only in the foregoing construction, the portable cellular telephone set of this embodiment is different from the above-mentioned portable cellular telephone set 1. In this embodiment, therefore, only the construction for performing the positional restriction by means of the first and second hinges 6A through 7B with respect to the reception case 3 and the hinge main body 5 will be described. The same component parts as in the portable cellular telephone set 1 are denoted by same reference numerals and description thereof is omitted.

In case the reception case 3 is to be returned to the folded position shown in FIG. 1(A) from the transmission position shown in FIG. 1(C) via the intermediate position shown in FIG. 1(B) after the reception case 3 is turned to the transmission position from the folded position via the intermediate position, the reception case 3 and the hinge main body 5 are turned in the same order as the reception case 3 and the hinge main body 5 of the portable cellular telephone set 1. That is, at the time the reception case 3 is turned to the intermediate position from the folded position, the hinge main body 5 is held in the stopped state shown in FIGS. 1(A) and 27. The position of the hinge main body 5 at that time is the first initial position. On the other hand, the reception case 3 is turned by a predetermined angle (100 degrees in this embodiment) to the second turning position shown in FIGS. 1(B) and 28 from the second initial position shown in FIGS. 1(A) and 27 about the second turning axis L2 with respect to the hinge main body 5. By this, the reception case 3 is turned to the intermediate position from the folded position. Therefore, when the hinge main body 5 is located in the first initial position, the folded position and the second initial position of the reception case 3 are in the same position and the intermediate position and the second turning position are in the same position. When it is attempted to turn the reception case 3 further toward the transmission position from the intermediate position, the reception case 3 is held in the stopped state with respect to the hinge main body 5, and the hinge main body 5 begins to turn toward the first turning position from the first initial position about the first turning axis L1. As a result, the reception case 3 is turned toward the transmission position from the intermediate position. When the hinge main body 5 reaches the first turning position shown in FIGS. 1(C) and 29 by turning by a predetermined angle (60 degrees in this embodiment), the hinge main body 5 is stopped. At that time, the reception case 3 already reaches the transmission position by turning in unison with the hinge main body 5 about the first turning axis L1.

In case the reception case 3 is to be turned to the intermediate position from the transmission position, the reception case 3 is held in the stopped state in the second turning position with respect to the hinge main body 5, and the hinge main body 5 is turned to the first initial position from the first turning position about the first turning axis L1. By this, the reception case 3 is turned to the intermediate position from the transmission position. At the time the reception case 3 is to be turned to the folded position from the intermediate position, the hinge main body 5 is held in the stopped state in the first initial position, and the reception case 3 is turned to the second initial position from the second turning position about the second turning axis L2 with respect to the hinge main body 5. By this, the reception case 3 is turned to the folded position from the intermediate position. In the folded position, the reception case 3 is not abutted against the transmission case 2 but the reception case 3 is slightly away from the transmission case 2.

Figure 30A:
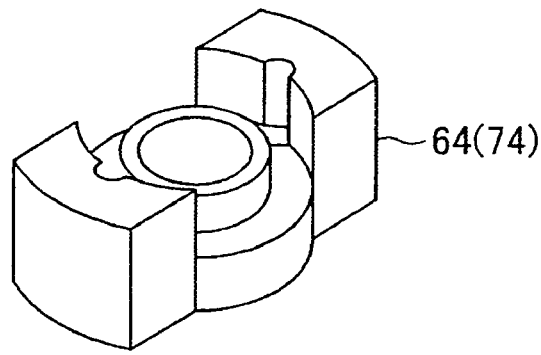
FIG. 30(A) is a perspective view showing a first movable member which is employed in the first embodiment.
Figure 30B:
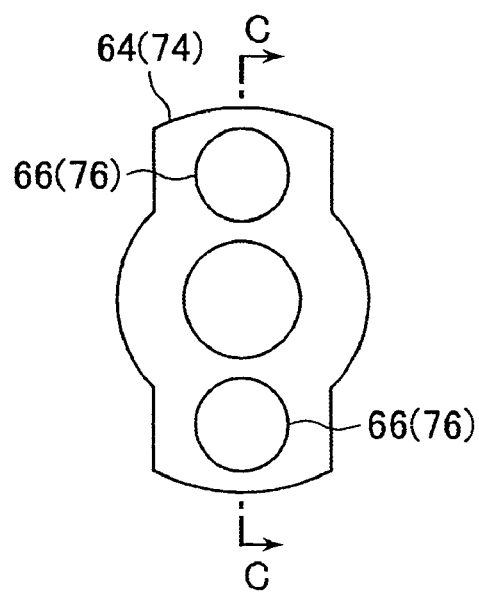
FIG. 30(B) is a bottom view of FIG. 30(A).
Figure 30C:
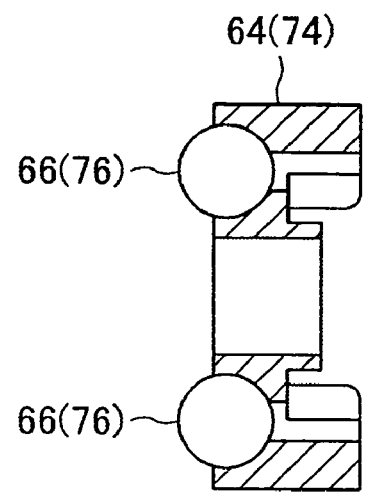
FIG. 30(C) is a cross sectional view taken on line C-C of FIG. 30(B).

In order to turn the reception case 3 and the hinge main body 5 in the above-mentioned order, as shown in FIG. 30, a pair of spherical bodies 66, 66 are symmetrically arranged with respect to the first turning axis L1 on the confronting surface of the first movable member 64 with the first turnable member 63. That is, the pair of spherical bodies 66, 66 are on the circumference about the first turning axis L1 in such a manner as to be 180 degrees away from each other in the peripheral direction. A pair of spherical bodies 76, 76 are arranged in the same relation between the pair of spherical bodies 66, 66 on the confronting surface of the second movable member 74 with the second turnable member 73. As shown in FIG. 31, two pairs of the first engagement recesses 63A, 63B are formed on the confronting surface of the first turnable member 63 with the first movable member 64, and two pairs of recesses 73A, 73B are formed on the confronting surface of the second turnable member 73 with the second movable member 74. The two pairs of first engagement recesses 63A, 63B are arranged on the same circumference as the circumference on which the one pair of spherical bodies 66, 66 are arranged. The one pair of first engagement recesses 63A, 63B and the other pair of first engagement recesses 63A, 63B are symmetrically arranged about the first turning axis L1. That is, they are arranged 180 degrees away from each other in the peripheral direction. The first engagement recesses 63A, 63B are arranged away from each other in the peripheral direction by a predetermined angle (about 60 degrees in this embodiment). The two pairs of second engagement recesses 73A, 73B are arranged on the case circumference as the circumference on which the pair of spherical bodies 76, 76 are arranged. The one pair of second engagement recesses 73A, 73B and the other pair of second engagement recesses 73A, 73B are symmetrically arranged about the second turning axis L2. That is, they are arranged 180 degrees away from each other. The second engagement recesses 73A, 73B are arranged away from each other in the peripheral direction by a predetermined angle (about 100 degrees in this embodiment).

Figure 32:
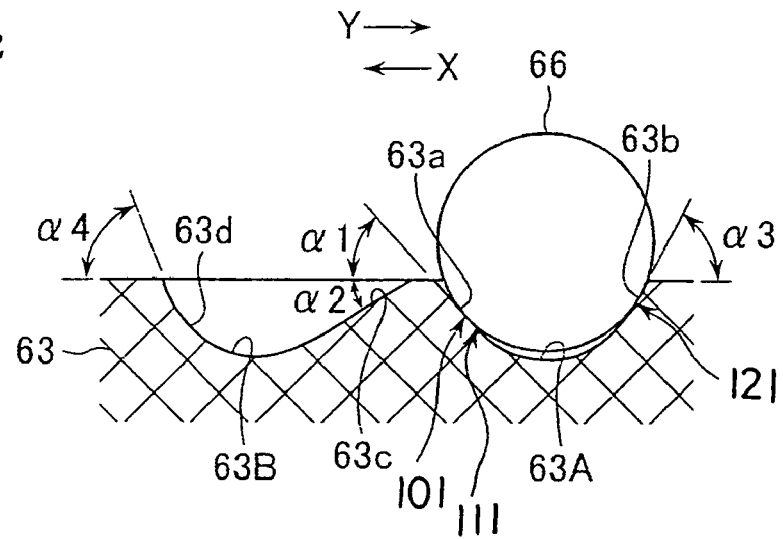
FIG. 32 is an enlarged cross sectional view taken on line I-I of FIG. 31(A).
Figure 35:
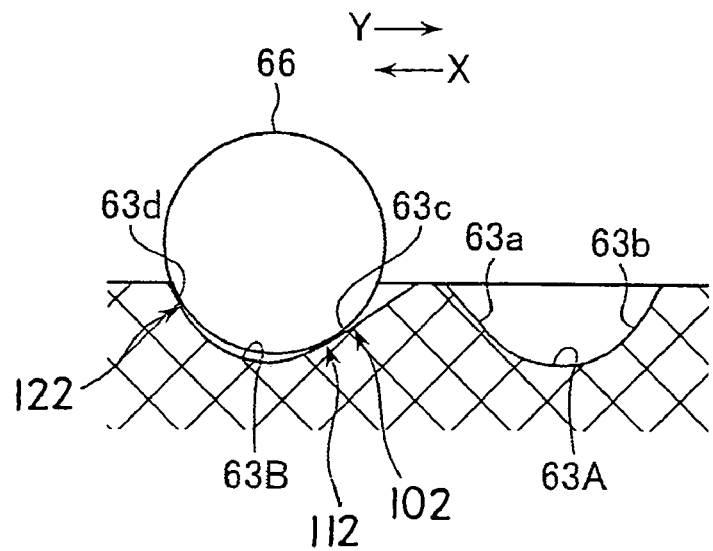
FIG. 35 is an enlarged cross sectional view taken on line IV-IV of FIG. 31(C).

As shown in FIGS. 32 and 35, the first engagement recess 63A includes inclination surfaces 63a, 63b having rising gradients rising toward the opposite end edges in the peripheral direction about the first turning axis L1 from the central part of the recess 63A. As shown in FIG. 32, the inclination surfaces 63a, 63b are arranged such that when the hinge main body 5 is located in the first initial position, the spherical body 66 biased by the first coiled spring 65 is simultaneously press contacted with the inclination surfaces 63a, 63b. By this, the hinge main body 5 is held in the first initial position as long as no force acts on the hinge main body 5.

The inclination surface 63a of the first engagement recess 63A converts the biasing force of the first coiled spring 65 into a turn biasing force. This turn biasing force prohibits the spherical body 66 from moving in the direction indicated by arrow X (in the peripheral direction about the first turning axis L1) of FIG. 32 through the first fixing member 61 and the first movable member 64 which would otherwise move in that direction when the hinge main body 5 is turned toward the first turning position from the first initial position. As a result, the turn biasing force of the first coiled spring 65 serves as a turn prohibiting force for prohibiting the hinge main body 5 from turning toward the first turning position from the first initial position. Therefore, the first conversion means 101 is constituted by the spherical body 66 and the inclination surface 63a, and the first turn prohibition means 111 is constituted by the first conversion means 101 and the first coiled spring 65.

The inclination surface 63b of the first engagement recess 63A converts the biasing force of the first coiled spring 65 into a turn biasing force. This turn biasing force prohibits the spherical body 66 from moving in the direction indicated by arrow Y of FIG. 32, thereby stopping the hinge main body 5 in the first initial position, when the hinge main body 5 tends to move beyond the first initial position in case the hinge main body 5 is to be turned toward the first initial position from the first turning position about the first turning axis L1. Therefore, the first stop means 121 is constituted by the first coiled spring 65, the spherical body 66, and the inclination surface 63b.

As shown in FIGS. 32 and 35, the first engagement recess 63B includes inclination surfaces 63c, 63d having a rising gradients rising toward the opposite end edges in the peripheral direction about the first turning axis L1 from the central part of the recess 63B. As shown in FIG. 35, the inclination surfaces 63c, 63d are arranged such that when the hinge main body 5 is located in the first turning position, the spherical body 66 biased by the first coiled spring 65 is simultaneously press contacted with the inclination surfaces 63c, 63d. By this, the hinge main body 5 is held in the first turning position as long as no force acts on the hinge main body 5.

The inclination surface 63c of the first engagement recess 63B converts the biasing force of the first coiled spring 65 into a turn biasing force. This turn biasing force prohibits the spherical body 66 from moving in the direction indicated by arrow Y which would otherwise move in that direction when the hinge main body 5 is turned toward the first initial position from the first turning position. As a result, the turn biasing force of the first coiled spring 65 serves as a turn prohibiting force for prohibiting the hinge main body 5 from turning toward the first initial position from the first turning position. Therefore, the second conversion means 102 is constituted by the spherical body 66 and the inclination surface 63c, and the second turn prohibition means 112 is constituted by the second conversion means 102 and the first coiled spring 65.

The inclination surface 63d of the first engagement recess 63B converts the biasing force of the first coiled spring 65 into a turn biasing force. This turn biasing force prohibits the spherical body 66 from moving in the direction indicated by arrow X of FIG. 35, thereby stopping the hinge main body 5 in the first turning position, when the hinge main body 5 tends to move beyond the first turning position in case the hinge main body 5 is to be turned toward the first turning position from the first initial position about the first turning axis L1. The second stop means 122 is constituted by the first coiled spring 65, the spherical body 66 and the inclination surface 63d.

Figure 33:
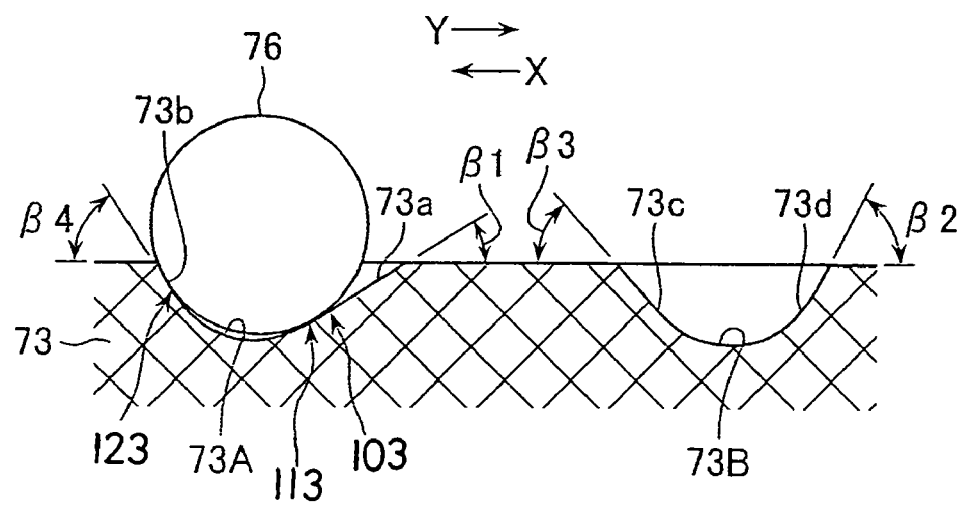
FIG. 33 is an enlarged cross sectional view taken on line II-II of FIG. 31(A).
Figure 34:
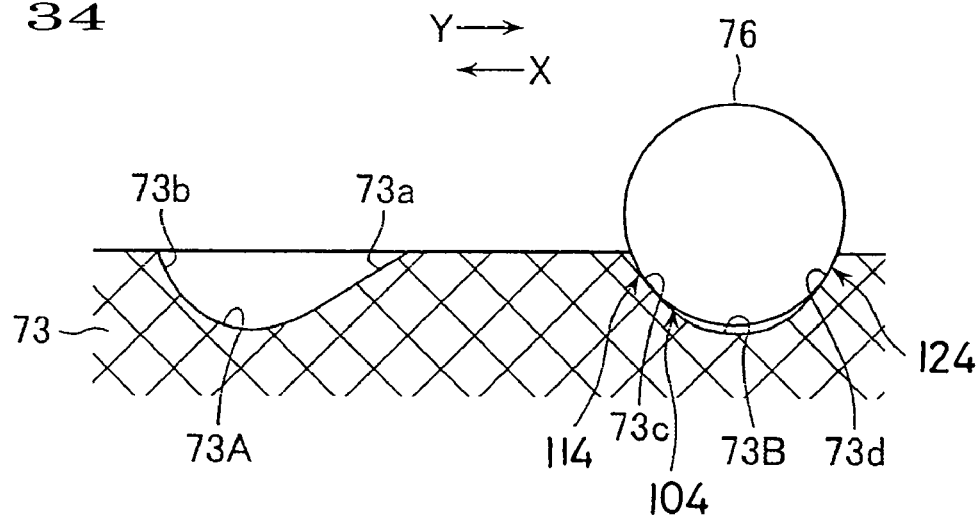
FIG. 34 is an enlarged cross sectional view taken on line III-III of FIG. 31(B).

As shown in FIGS. 33 and 34, the second engagement recess 73A includes inclination surfaces 73a, 73b having a rising gradients rising toward the opposite end edges in the peripheral direction about the second turning axis L2 from the central part of the recess 73A. As shown in FIG. 33, the inclination surfaces 73a, 73b are arranged such that when the reception case 3 is located in the second initial position, the spherical body 76 biased by the second coiled spring 75 is simultaneously press contacted with the inclination surfaces 73a, 73b. By this, the reception section 3 is held in the second initial position as long as no force acts on the reception section 3.

The inclination surface 73a of the second engagement recess 73A converts the biasing force of the second coiled spring 75 into a turn biasing force. This turn biasing force prohibits the second turnable member 73 from turning in the direction indicated by arrow X of FIG. 33, when the reception case 3 tends to turn toward the second turning position from the second initial position about the second turning axis L2, thereby the turn biasing force acts as a turn prohibiting force for prohibiting the reception case 3 from turning toward the second turning position from the second initial position. Therefore, the third conversion means 103 is constituted by the spherical body 76 and the inclination surface 73a, and the third turn prohibition means 113 is constituted by the third conversion means 103, and the second coiled spring 75.

The inclination surface 73b of the second engagement recess 73A converts the biasing force of the second coiled spring 75 into a turn biasing force. This turn biasing force prohibits the second turnable member 73 from moving in the direction indicated by arrow Y of FIG. 33 in accordance with the turning operation of the reception case 3, thereby stopping the reception case 3 in the second initial position, when the reception case 3 tends to move beyond the second initial position in case the reception case 3 is to be turned toward the second initial position from the second turning position. Therefore, the third stop means 123 is constituted by the second coiled spring 75, the inclination surface 73b and the spherical body 76.

As shown in FIGS. 33 and 34, the second engagement recess 73B includes inclination surfaces 73c, 73d having rising gradients rising toward the opposite end edges in the peripheral direction about the second turning axis L2 from the central part of the recess 73B. As shown in FIG. 34, the inclination surfaces 73c, 73d are arranged such that when the reception case 3 is located in the second turning position, the spherical body 76 biased by the second coiled spring 75 is simultaneously press contacted with the inclination surfaces 73c, 73d. By this, the reception section 3 is held in the second turning position as long as no force acts on the reception section 3.

The inclination surface 73c of the second engagement recess 73B converts the biasing force of the second coiled spring 75 into a turn biasing force. This turn biasing force prohibits the second turnable member 73 from turning in the direction indicated by arrow X of FIG. 33, when the reception case 3 tends to turn toward the second initial position from the second turning position about the second turning axis L2, thereby the turn biasing force acts as a turn prohibiting force for prohibiting the reception case 3 from turning toward the second initial position from the second turning position. Therefore, the fourth conversion means 104 is constituted by the spherical body 76 and the inclination surface 73c, and the fourth turn prohibition means 114 is constituted by the fourth conversion means 104 and the second coiled spring 75.

The inclination surface 73d of the second engagement recess 73B converts the biasing force of the second coiled spring 75 into a turn biasing force. This turn biasing force prohibits the second turnable member 73 from turning in the direction indicated by arrow X of FIG. 34 when the reception case 3 tends to turn beyond the second turning position in case the reception case 3 is to be turned toward the second turning position from the second initial position, thereby the turn biasing force prohibits the reception case 3 from turning beyond the second turning position and stops the reception case 3 in the second turning position. Therefore, the fourth stop means 124 is constituted by the second coiled spring 75, the inclination surface 73d and the spherical body 76.

Next, the turn prohibiting force and the stopping force of the respective means 111 through 114 and 121 through 124 are compared. Presume that the reception case 3 is located in the folded position. That is, presume that the hinge main body 5 is located in the first initial position and the reception case 3 is located in the second initial position. When it is attempted to turn the reception case 3 toward the intermediate position from the folded position, the first turn prohibition means 111 prohibits the hinge main body 5 from turning toward the first turning position from the first initial position, and the third turn prohibition means 113 prohibits the reception case 3 from turning toward the second turning position from the second initial position. In case the inclination angle of the inclination surface 63a of the first engagement recess 63A which constitutes a part of the first turn prohibition means 111 is represented by α1 (see FIG. 32) and the inclination angle of the inclination surface 73a of the second engagement recess 73A which constitutes a part of the third turn prohibition means 113, by β1 (see FIG. 33), respectively, the following expression can be established.

$$\alpha 1 > \beta 1$$

Accordingly, when the turn prohibiting force of the first turn prohibition means is compared with the turn prohibiting force of the third turn prohibition means 113, the former is larger than the latter. Thus, when it is attempted to turn the reception case 3 located in the folded position toward the intermediate position, the hinge main body 5 is held in the first initial position and the reception case 3 is turned toward the second turning position from the second initial position against the turn biasing force of the third turn biasing means 113.

In case the reception case 3 is located in the intermediate position, that is, in case the hinge main body 5 is located in the first initial position and the reception case 3 is located in the second turning position, when it is attempted to turn the reception case 3 toward the transmission position from the intermediate position, the first turn prohibition means 111 prevents the hinge main body 5 from turning toward the first turning position from the first initial position and the fourth stop means prohibits the reception case 3 from turning beyond the second turning position. In case the inclination angle of the inclination surface 73d of the second engagement recess 73B which constitutes a part of the fourth stop means 10D is represented by β2 (see FIG. 33), the following expression can be established.

$$\alpha 1 < \beta 2$$

Accordingly, when the turn prohibiting force of the first turn prohibition means 111 is compared with the turn prohibiting force of the fourth stop means 124, the latter is larger than the former. Thus, when the reception case 3 located in the intermediate position is turned toward the transmission position, the reception case 3 is prohibited from turning beyond the second turning position with respect to the hinge main body 5 and held in the stopped state in the second turning position. On the other hand, the hinge main body 5 is turned toward the first turning position from the first initial position against the turn prohibiting force of the first turn prohibition means 111.

In case the reception case 3 is located in the transmission position, the reception case 3 is located in the second turning position with respect to the hinge main body 5 and the hinge main body 5 is located in the first turning position. In that state, when it is attempted to turn the reception case 3 toward the intermediate position from the transmission position, the second turn prohibition means 112 prohibits the spherical body 66 from moving in the direction indicated by arrow Y of FIG. 35 and thus, prohibits the hinge main body 5 from turning toward the first initial position from the first turning position. Simultaneously with this, the fourth turn prohibition means 114 prohibits the second turnable member 73 from turning in the direction indicated by arrow X of FIG. 34, and thus, prohibits the reception case 3 from turning toward the second initial position from the second turning position. In case the inclination angle of the inclination surface 63c of the first engagement recess 63B which constitutes a part of the second turn prohibition means 112 is represented by α2 (see FIG. 32), and the inclination angle of the inclination surface 73c of the second engagement recess 73B which constitutes a part of the fourth turn prohibition means 114, by β3 (see FIG. 33), respectively, the following expression can be established.

$$\alpha 2 < \beta 3$$

Accordingly, when the turn prohibiting force of the second turn prohibition means 112 is compared with the turn prohibiting force of the fourth turn prohibition means 114, the latter is larger than the former. Thus, when the reception case 3 located in the transmission position is turned toward the intermediate position, the reception case 3 is held in the stopped state in the second turning position and the hinge main body 5 is turned toward the first initial position from the first turning position.

When the reception case 3 is located in the intermediate position, the hinge main body 5 is located in the first initial position, and the reception case 3 is located in the second turning position with respect to the hinge main body 5. In that state, when it is attempted to turn the reception case 3 toward the folded position from the intermediate position, the first stop means 121 prohibits the spherical body 66 from moving in the direction indicated by arrow Y of FIG. 32 and prohibits the hinge main body 5 from turning beyond the first initial position. Simultaneously with this, the fourth turn prohibition means 114 prohibits the second turnable member 73 from turning in the direction indicated by arrow Y of FIG. 34 and prohibits the reception case 3 from turning toward the second initial position from the second turning position. In case the inclination angle of the inclination surface 63b of the first engagement recess 63A which constitutes a part of the first stop means 121 is represented by α3 (see FIG. 32), the following expression can be established.

$$\alpha 3 > \beta 3$$

Accordingly, when the stopping force of the first stop means 121 is compared with the turn prohibiting force of the fourth turn prohibition means 114, the former is larger than the latter. Thus, when the reception case 3 located in the intermediate position is turned toward the folded position, the hinge main body 5 is held in the stopped state in the first initial position and the reception case 3 is turned toward the second initial position from the second turning position.

The angle α3 is set to be same as the angle β2. In case the inclination angle of the inclination surface 63d of the first engagement recess 63B which constitutes a part of the second stop means 122 is represented by α4 (see FIG. 32) and the inclination angle of the inclination surface 73b of the second engagement recess 73A which constitutes a part of the third stop means 123, by β4 (see FIG. 33), respectively, the following expression can be established.

$$\alpha 4 = \beta 4 = \alpha 3 (= \beta 2)$$

In the portable cellular telephone set 1 constructed in the manner as mentioned above, presume that the reception case 3 is located in the folded position. In this state, as shown in FIG. 32, the spherical body 66 is in contact with the inclination surfaces 63a, 63b of the first engagement recess 63A, and as shown in FIG. 33, the spherical body 76 is in contact with the inclination surfaces 73a, 73b of the second engagement recess 73A. When the reception case 3 is turned toward the transmission position, the hinge main body 5 is held in the stopped state in the first initial position and the reception case 3 is turned toward the second turning position from the second initial position against the turn biasing force of the third turn prohibition means 113. When the reception case 3 is moved by a predetermined angle (for example, 10 degrees) from the second initial position, the spherical body 76 escapes from the second engagement recess 73A. Then, the spherical body 76 contacts the confronting surface of the second turnable member 73 with the second movable member 74. This confronting surface is a plane orthogonal to the second turning axis L2. Therefore, a frictional resistance in correspondence with the biasing force of the coiled spring 75 is generated between the confronting surface and the spherical body 76. By this frictional resistance, the reception case 3 can be stopped in an optional position within a range after the spherical body 76 is escaped from the second engagement recess 73A until the spherical body 76 is entered into the second engagement recess 73B.

When the reception case 3 reaches a position which is located before the intermediate position by a predetermined angle (for example, 10 degrees), the spherical body 76 contacts the inclination surface 73c of the second engagement recess 73B. Then, the reception case 3 is automatically turned to the intermediate position (second turning position) by the biasing force of the fourth turn prohibition means 114. When the reception case 3 reaches the intermediate position, the spherical body 76 is abutted against the inclination surface 73d and stopped, and the reception case 3 is stopped in the intermediate position. At that time, as shown in FIG. 32, the spherical body 66 already contacts the inclination surfaces 63a, 63b of the first engagement recess 63A, and as shown in FIG. 34, the spherical body 76 already contacts the inclination surfaces 73c, 73d of the second engagement recess 73B.

In case the reception case 3 is to be turned toward the transmission position from the intermediate position, the reception case 3 is held in the stopped state in the second turning position and the hinge main body 5 is turned toward the first turning position from the first initial position against the biasing force of the first turn prohibition means 111. When the hinge main body 5 is turned by a predetermined angle from the first initial position, the spherical body 66 escapes from the first engagement recess 63A and contacts the confronting surface of the first turnable member 63 with the first movable member 64. This confronting surface is a plane orthogonal to the first turning axis L1. Therefore, a frictional resistance in correspondence with the biasing force of the coiled spring 65 is generated between the confronting surface and the spherical body 66. By this frictional resistance, the reception case 3 can be stopped in an optional position within a range after the spherical body 66 is escaped from the first engagement recess 63A until the spherical body 66 is entered into the first engagement recess 63B.

When the reception case 3 reaches a position which is located before the transmission position by a predetermined angle (for example, 10 degrees), in other words, when the hinge main body 5 reaches a position which is located before the first turning position by a predetermined angle, the spherical body 66 contacts the inclination surface 63c of the first engagement recess 63B. Then, the hinge main body 5 is automatically turned to the first turning position by the biasing force of the second turn prohibition means 112. In accompaniment therewith, the reception case 3 is turned to the transmission position. When the reception case 3 reaches the transmission position, the spherical body 66 is abutted against the inclination surface 63d and stopped, and the reception case 3 is stopped in the transmission position. At that time, as shown in FIGS. 35 and 34, the spherical body 66 already contacts the inclination surfaces 63c, 63d of the first engagement recess 63B and the spherical body 76 already contacts the inclination surfaces 73c, 73d of the second engagement recess 73B.

The reception case 3 stopped in the transmission position can be further turned beyond the transmission position against the biasing force of the second stop means 122 or fourth stop means 124. However, when the reception case 3 is turned by a small angle beyond the transmission position, one end part of the reception case 3 is abutted against one end part of the transmission case 2 and stopped immediately, thereby the reception case 3 is unable to turn any further in that direction. The position where the reception case 3 is abutted against the transmission case 2 may be arranged as a transmission position. In that case, it is desirable to arrange such that when the reception case 3 reaches the transmission position, the spherical body 66 is located in a position which is located immediately before the body 66 is abutted against the inclination surface 63d, and such that the reception case 3 is held in the abutted state (the state where the reception case 3 is located in the transmission position) with the transmission case 2 by the biasing force of the second turn prohibition means 112.

In case the reception case 3 is to be turned toward the intermediate position from the transmission position, the reception case 3 is held in the stopped state in the second turning position and the hinge main body 5 is turned toward the first initial position from the first turning position against the biasing force of the second turn prohibition means 112. When the hinge main body 5 is turned to a position which is located before the first initial position by a predetermined angle (for example, 10 degrees), the spherical body 66 contacts the inclination surface 73a of the first engagement recess 63A. As a result, the hinge main body 5 is automatically turned to the first initial position by the turn biasing force of the first turn prohibition means 111. The hinge main body 5, having reached the first initial position, is stopped in the intermediate position since the spherical body 66 is abutted against the inclination surface 63b of the first engagement recess 63A and stopped. When the hinge main body 5 is turned to the first initial position from the first turning position and stopped, the reception case 3, which is turned in unison with the hinge main body 5, is turned to the intermediate position from the transmission position and stopped in the intermediate position. When the hinge main body 5 is located within a predetermined range between the first turning position and the first initial position but excluding the opposite ends, the reception case 3 can be stopped in an optional position by the frictional resistance acting between the spherical body 66 and the first turnable member 63 as in the above-mentioned case.

In case the reception case 3 is to be turned toward the folded position from the intermediate position, the hinge main body 5 is held in the stopped state in the first initial position and the reception case 3 is turned toward the second initial position from the second turning position against the turn biasing force of the fourth turn prohibition means 114, When the spherical body 76 reaches a position which is located before the second initial position by a predetermined angle (for example, 10 degrees), the spherical body 76 is contacted with the inclination surface 73a of the second engagement recess 73A. As a result, the reception case 3 is automatically turned to the second initial position by the turn biasing force of the third turn prohibition means 113. When the reception case 3 is turned to the second initial position, the spherical body 76 is abutted against the inclination surface 73b of the first engagement recess 73A. By this, the reception case 3 is stopped. At that time, the reception case 3 already reaches the folded position. By this, the portable cellular telephone set 1 is returned to the original state.

The reception case 3 located in the folded position can be further turned beyond the turn biasing force of the first stop means 121 or third stop means 123. However, when the reception case 3 is turned by a small angle beyond the folded position, the front surface 3a of the reception case 3 is immediately abutted against the front surface 2a of the transmission case 2 and stopped, thereby the reception case 3 is unable to turn any further in that direction. The position where the reception case 3 is abutted against the transmission case 2 may be arranged as the folded position. In that case, it is desirable to arrange such that when the reception case 3 reaches the folded position, the spherical body 76 is located in a position immediately before the spherical body 76 is abutted against the inclination surface 73b, and that the reception case 3 is held in the abutted state (the state located in the folded position) against the transmission case 2 by the biasing force of the third turn prohibition means 113.

As mentioned above, although the transmission case 2 and the reception case 3 are turnably connected to each other through the two-axis hinge apparatus 4 in this embodiment, the turning order between the reception case 3 and the hinge main body 5 can be made normally constant. Accordingly, the user of the portable cellular telephone set 1 can be prevented from getting a sense of uncomfortability.

Other modes according to the present invention will now be described. In the modes to be described hereinafter, the turning order between the reception case 3 and the hinge main body 5 is changed.

In a third mode of the present invention, when the reception case 3 is turned up to the transmission position from the folded position via the intermediate position, first, the hinge main body 5 is turned to the first turning position from the first initial position so that the reception case 3 is turned to the intermediate position, and thereafter, the reception case 3 is turned to the second turning position from the second initial position so that the reception case 3 is turned to the transmission position. The turning order between the reception case 3 and the hinge main body 5 during the time the reception case 3 is turned to the folded position from the transmission position is same as in the above-mentioned embodiments.

In order to turn the hinge main body 5 to the first turning position from the first initial position with the reception case 3 held in the stopped state in the second initial position, thereby turning the reception case 3 to the intermediate position, the following expression is employed between the inclination angle $\alpha 1$ of the inclination surface 63a of the first engagement recess 63A which constitutes a part of the first turn prohibition means 111 and the inclination angle $\beta 1$ of the inclination surface 73a of the second engagement recess 73A which constitutes a part of the third turn prohibition means 113.

$$\alpha 1 < \beta 1$$

As a result, the turn prohibiting force (turn biasing force) of the third turn prohibition means 113 is larger than the turn prohibiting force of the first turn prohibition means 111. Accordingly, at the time the reception case 3 is turned to the intermediate position from the folded position, the reception case 3 is held in the stopped state with respect to the hinge main body 5 and the hinge main body 5 is turned to the first turning position from the first initial position.

At the time the reception case 3 is turned to the transmission position from the intermediate position, the hinge main body 5 is held in the stopped state in the first turning position and the reception case 3 is turned to the second turning position from the second initial position. In order to realize such turning order, the inclination angle $\alpha 4$ of the inclination surface 63d of the first engagement recess 63B is set to be larger than the inclination angle $\beta 1$ of the inclination surface 73a of the second engagement recess 73A. As a result, the turn stopping force of the second stop means 122 is larger than the turn prohibiting force of the third turn prohibition means 113. Therefore, at the time the reception case 3 is turned to the transmission position from the intermediate position, the hinge main body 5 is held in the stopped state and the reception case 3 is turned.

In the fourth mode of the present invention, contrary to the third mode, in case the reception case 3 is to be turned to the transmission position from the folded position, as in the second mode, the hinge main body 5 is turned to the first turning position from the first initial position after the reception case 3 is turned to the second turning position from the second initial position. However, in case the reception case 3 is to be turned to the folded position from the transmission position, the hinge main body 5 is turned to the first initial position from the first turning position after the reception case 3 is turned to the first turning position from the second turning position.

In order to realize such turning order as the reception case 3 first and then the hinge main body 5 at the time the reception case 3 is turned to the folded position from the transmission position, first, the expression $\alpha 2 > \beta 3$ is employed. The employment of such angular relationship enables the turn prohibiting force (turn biasing force) of the second turn prohibition means 112 to be made larger than the turn prohibiting force of the fourth turn prohibition means 114. Accordingly, at the time the reception case 3 is turned toward the intermediate position from the transmission position, the hinge main body 5 is held in the stopped state in the first turning position and the reception case 3 is turned to the second initial position from the second turning position.

In order to realize such turning order as the hinge main body 5 first and then the reception case 3 at the time the reception case 3 is turned to the folded position from the intermediate position, the expression $\alpha 2 < \beta 4$ is employed. The employment of such angular relationship enables the turn stopping force of the third turn stop means 123 to be made larger than the turn prohibiting force (turn biasing force) of the second turn prohibition means 112. Accordingly, at the time the reception case 3 is turned to the folded position from the intermediate position, the reception case 3 is held in the stopped state in the second initial position and the hinge main body 5 is turned to the first initial position from the intermediate position.

The turning order between the reception case 3 and the hinge main body 5 can be made entirely reversed compared to the turning order in the second mode. In that case, the hinge main body 5 is turned to the first turning position from the first initial position, thereby allowing the reception case 3 to turn to the intermediate position from the folded position, and thereafter, the reception case 3 is turned to the second turning position from the second initial position, thereby allowing the reception case 3 to turn to the transmission position from the intermediate position. In contrast with this, in case the reception case 3 is to be turned to the folded position from the transmission position, the hinge main body 5 is turned to the first initial position from the first turning position after the reception case 3 is turned to the second initial position from the second turning position thereby allowing the reception case 3 to turn to the folded position from the transmission position via the intermediate position.

It should be noted that the second through fifth modes of the present invention are not limited to the above-mentioned embodiments, but many changes and modifications can be made in accordance with necessity without departing from the spirit of the invention.

For example, instead of the respective inclination surfaces 63b, 63d, 73b, 73d each of which constitutes a part of the corresponding first through fourth stop means 121 through 124, a plane parallel to the first and second turning axes L1, L2 may be employed.

Moreover, the first and second fixing members 61, 71 may be integrally formed with the hinge main body 5. In that case, the first and second movable members 64, 74 are movably but non-turnably disposed at the hinge main body 5.

INDUSTRIAL APPLICABILITY

The present invention can be utilized as a connecting apparatus or a two-hinge apparatus for turnably connecting a transmission case and a reception case of a portable cellular telephone set or a main body case and a display case of a notebook type personal computer.

The invention claimed is:

1. An opening/closing apparatus for an equipment case comprising a first case having a first hinge, a second case having a second hinge, and a hinge apparatus having a hinge main body comprising a first end part that is turnably connected to said first hinge of said first case about a first turning axis and comprising a second end part that is turnably connected to said second hinge of said second case about a second turning axis parallel to said first turning axis, said hinge main body being turned with respect to said first case and said second case being turned with respect to said hinge main body, thereby said second case being turnable with respect to said first case between a folded position and a developing position, wherein said first hinge comprises a first turnable member that is turnably connected to a first fixing member, said first fixing member being non-turnably connected to one of said hinge apparatus and said first case, said first turnable member being non-turnably connected to the other of said hinge apparatus and said first case, wherein said second hinge comprises a second turnable member that is turnably connected to a second fixing member, said second fixing member being non-turnably connected to one of said hinge apparatus and said second case, said second turnable member being non-turnably connected to the other of said hinge apparatus and said second case, wherein between said first case and said hinge main body, there are provided a first stop means adapted to stop said hinge main body in a predetermined initial position when said hinge main body is turned to said predetermined initial position in a first direction so that said second case is turned toward said folded position from said developing position, a second stop means adapted to stop said hinge main body in a predetermined terminal position when said hinge main body is turned to said predetermined terminal position in a second direction so that said second case is turned toward said developing position from said folded position, a first turn prohibition means adapted to prohibit said hinge main body from turning in the second direction from said predetermined initial position with a predetermined force generated from a first biasing means, and a second turn prohibition means adapted to prohibit said hinge main body from turning in said first direction from said terminal position with a predetermined force generated from the first biasing means, between said second case and said hinge main body, there are provided a third stop means adapted to stop said second case in a predetermined intermediate position when said second case is turned to said predetermined intermediate position on the way toward said folded position from said developing position in an opening direction with respect to said hinge main body, a third turn prohibition means adapted to prohibit said second case from turning in said opening direction from said folded position with a predetermined force generated from a second biasing means, and a fourth turn prohibition means adapted to prohibit said second case from turning toward said folded position from said intermediate position in a closing direction with a predetermined force generated from the second biasing means, and said prohibiting force of said first turn prohibition means is set to be larger than said prohibiting force of said third turn prohibition means, and said prohibiting force of said fourth turn prohibition means is set to be larger than said prohibiting force of said second turn prohibition means.

2. An opening/closing apparatus for an equipment case according to claim 1, wherein said first turn prohibition means is a first turn biasing means adapted to turn bias said hinge main body in said first direction when said hinge main body is located in said predetermined initial position, said second turn prohibition means is a second turn biasing means adapted to turn bias said hinge main body in said second direction when said hinge main body is located in said terminal position, said third turn prohibition means is a third turn biasing means adapted to turn bias said second case in said closing direction when said second case is located in said folded position, and said fourth prohibition means is a fourth turn biasing means adapted to turn bias said second case in said opening direction when said second case is located in said intermediate position.

3. An opening/closing apparatus for an equipment case according to claim 2, wherein said first hinge further includes a first movable member disposed at one of said first case and said hinge main body such that said first movable member is non-turnable but movable in the direction of said first turning axis, and the first biasing means adapted to bias said first movable member toward said the other of said first case and said hinge main body, between confronting surfaces of said first movable member and said the other of said first case and said hinge main body, there are provided a first conversion means adapted to convert the biasing force of said first biasing means acting on said first movable member when said hinge main body is located in said predetermined initial position, into a turn biasing force for turn biasing said hinge main body in said first direction, and a second conversion means adapted to convert the biasing force of said first biasing means acting on said first movable member when said hinge main body is located in said terminal position, into a turn biasing force for turn biasing said hinge main body in said second direction, said first turn biasing means is constituted by said first biasing means and said first conversion means, and said second turn biasing means is constituted by said first biasing means and said second conversion means, said second hinge further includes a second movable member disposed at one of said second case and said hinge main body such that said second movable member is non-turnable but movable in the direction of said second turning axis, and the second biasing means adapted to bias said second movable member toward said the other of said second case and said hinge main body, between confronting surfaces of said second movable member and said the other of said second case and said hinge main body, there are provided a third conversion means adapted to convert the biasing force of said second biasing means acting on said second movable member when said second case located in said folded position, into a turn biasing force for turn biasing said second case in said closing direction, and a fourth conversion means adapted to convert the biasing force of said second biasing means acting on said second movable member when said second case is located in said intermediate position, into a turn biasing force for turn biasing said second case in said opening direction, and said third turn biasing means is constituted by said second biasing means and said third conversion means, and said fourth turn biasing means is constituted by said second biasing means and said fourth conversion means.

4. An opening/closing apparatus for an equipment case according to claim 3, wherein said folded position is restricted by abutment of said second case against said first case.

5. An opening/closing apparatus for an equipment case according to claim 3, wherein said intermediate position is defined such that when said second case is located in said intermediate position, said second case is located on a line orthogonal to said first and second turning axes.

6. An opening/closing apparatus for an equipment case according to claim 2, wherein said folded position is restricted by abutment of said second case against said first case.

7. An opening/closing apparatus for an equipment case according to claim 2, wherein said intermediate position is defined such that when said second case is located in said intermediate position, said second case is located on a line orthogonal to said first and second turning axes.

8. An opening/closing apparatus for an equipment case according to claim 1, wherein said folded position is restricted by abutment of said second case against said first case.

9. An opening/closing apparatus for an equipment case according to claim 8, wherein said intermediate position is defined such that when said second case is located in said intermediate position, said second case is located on a line orthogonal to said first and second turning axes.

10. An opening/closing apparatus for an equipment case according to claim 1, wherein said intermediate position is defined such that when said second case is located in said intermediate position, said second case is located on a line orthogonal to said first and second turning axes.

11. A two-axis hinge apparatus comprising a hinge main body, a first hinge disposed on said hinge main body with an axis thereof aligned with a first turning axis, and a second hinge disposed on said hinge main body with an axis thereof aligned with a second turning axis parallel to said first turning axis, wherein said first hinge includes a first fixing member non-turnably disposed on said hinge main body and a first turnable member connected to said first fixing member such that said first turnable member is turnable between a first initial position and a first turning position, between said first fixing member and said first turnable member, there are provided a first turn prohibition means adapted to prohibit said first turnable member from turning toward said first turning position from said first initial position with a predetermined force generated from a first biasing means, and a second turn prohibition means adapted to prohibit said first turnable member from turning toward said first initial position from said first turning position with a predetermined force generated from the first biasing means, said second hinge includes a second fixing member non-turnably disposed on said hinge main body and a second turnable member connected to said second fixing member such that said second turnable member is turnable between a second initial position and a second turning position, between said second fixing member and said second turnable member, there are provided a third turn prohibition means adapted to prohibit said second turnable member from turning toward said second turning position from said second initial position with a predetermined force generated from a second biasing means, and a fourth turn prohibition means adapted to prohibit said second turnable member from turning toward said second initial position from said second turning position with a predetermined force generated from the second biasing means, said turning direction toward said first turning position from said first initial position and said turning direction toward said second turning position from said second initial position are set to be same in direction, said turn prohibiting force of said first turn prohibition means is set to be larger than said turn prohibiting force of said third turn prohibition means, and said turn prohibiting force of said fourth turn prohibition means is set to be larger than said turn prohibiting force of said second turn prohibition means.

12. A two-axis hinge apparatus according to claim 11, wherein said first hinge further includes a first movable member disposed between said first fixing member and said first turnable member and connected to said first fixing member such that said first movable member is non-turnable but movable in a direction of said first turning axis, and said first biasing means adapted to bias said first movable member toward said first turnable member along said first turning axis, between confronting surfaces of said first turnable member and said first movable member, there are provided a first conversion means adapted to convert a biasing force of said first biasing means acting on said first movable member when said first turnable member is located in said first initial position, into a turn biasing force for turn biasing said first turnable member toward said first initial position from said first turnable position, and a second conversion means adapted to convert a biasing force of said first biasing means acting on said first movable member when said first turnable member is located in said first turnable position, into a turn biasing force for turn biasing said first turnable member toward said first turnable position from said first initial position, said first turn prohibition means is constituted by said first conversion means and said first biasing means, and said second turn prohibition means is constituted by said second conversion means and said first biasing means, and said first turnable member is turn biased by said first conversion means, said second hinge further includes a second movable member disposed between said second fixing member and said second turnable member and connected to said second fixing member such that said second movable member is non-turnable but movable in the direction of said second turning axis, and said second biasing means adapted to bias said second movable member toward said second turnable member along said second turning axis, between confronting surfaces of said second turnable member and said second movable member, there are provided a third conversion means adapted to convert a biasing force of said second biasing means acting on said second movable member when said second turnable member is located in said second initial position into a turn biasing force for turn biasing said second turnable member toward said second initial position from said second turning position, and a fourth conversion means adapted to convert a turn biasing force of said second biasing means acting on said second movable member when said second turnable member is located in said second turning position, into a turn biasing force for turn biasing said second turnable member toward said second turning position from said second initial position, said third turn prohibition means is constituted by said third conversion means and said second biasing means, said fourth turn prohibition means is constituted by said fourth conversion means and said second biasing means, and said second turnable member is turn biased by said fourth conversion means.

13. A two-axis hinge apparatus comprising a hinge main body, a first hinge disposed on said hinge main body with an axis thereof aligned with a first turning axis, and a second hinge disposed on said hinge main body with an axis thereof aligned with a second turning axis parallel to said first turning axis, wherein said first hinge includes a first fixing member non-turnably disposed on said hinge main body and a first turnable member connected to said first fixing member such that said first turnable member is turnable between a first initial position and a first turning position, between said first fixing member and said first turnable member, there are provided a first turn prohibition means adapted to prohibit said first turnable member from turning toward said first turning position from said first initial position with a predetermined force generated from a first biasing means, and a second turn prohibition means adapted to prohibit said first turnable member from turning toward said first initial position from said first turning position with a predetermined force generated from the first biasing means, said second hinge includes a second fixing member non turnably disposed on said hinge main body and a second turnable member connected to said second fixing member such that said second turnable member is turnable between a second initial position and a second turning position, between said second fixing means and said second turnable member, there are provided a third turn prohibition means adapted to prohibit said second turnable member from turning toward said second turning position from said second initial position with a predetermined force generated from a second biasing means, and a fourth turn prohibition means adapted to prohibit said second turnable member from turning toward said second initial position from said second turning position with a predetermined force generated from the second biasing means, said turning direction toward said first turning position from said first initial position and said turning direction toward said second turning position from said second initial position are set to be same in direction, said turn prohibiting force of said first turn prohibition means is set to be smaller than said turn prohibiting force of said third turn prohibition means, and said turn prohibiting force of said fourth turn prohibition means is set to be larger than said turn prohibiting force of said second turn prohibition means.

14. A two-axis hinge apparatus according to claim 13, wherein said first hinge further includes a first movable member disposed between said first fixing member and said first turnable member and connected to said first fixing member such that said first movable member is non-turnable but movable in the direction of said first turning axis, and said first biasing means adapted to bias said first movable member toward said first turnable member along said first turning axis, between confronting surfaces of said first turnable member and said first movable member, there are provided a first conversion means adapted to convert a biasing force of said first biasing means acting on said first movable member when said first turnable member is located in said first initial position, into a turn biasing force for turn biasing said first turnable member toward said first initial position from said first turning position, and a second conversion means adapted to convert a biasing force of said first biasing means acting on said first movable member when said first turnable member is located in said first turning position, into a turn biasing force for turn biasing said first turnable member toward said first turning position from said first initial position, said first turn prohibition means is constituted by said first conversion means and said first biasing means, said second turn prohibition means is constituted by said second conversion means and said first biasing means, said first turnable member is turn biased by said first conversion means, and said first turnable member is turn biased by said second conversion means, said second hinge further includes a second movable member disposed between said second fixing member and said second turnable member and connected to said second fixing member such that said second movable member is non turnable but movable in the direction of said second turning axis, and said second biasing means adapted to bias said second movable member toward said second turnable member along said second turning axis, between confronting surfaces of said second turnable member and said second movable member, there are provided a third conversion means adapted to convert a biasing force of said second biasing means acting on said second movable member when said second turnable member is located in said second initial position into a turn biasing force for turn biasing said second turnable member toward said second initial position from said second turning position, and a fourth conversion means adapted to convert a biasing force of said second biasing means acting on said second movable member when said second turnable member is located in said second turning position into a turn biasing force for turn biasing said second turnable member toward said second turning position from said second initial position, said third turn prohibition means is constituted by said third conversion means and said second biasing means, and said fourth turn prohibition means is constituted by said fourth conversion means and said second biasing means.

15. A two-axis hinge apparatus comprising a hinge main body, a first hinge disposed on said hinge main body with an axis thereof aligned with a first turning axis, and a second hinge disposed on said hinge main body with an axis thereof aligned with a second turning axis parallel to said first turning axis, wherein said first hinge includes a first fixing member non-turnably disposed on said hinge main body and a first turnable member connected to said first fixing member such that said first turnable member is turnable between said first initial position and said first turning position, between said first fixing member and said first turnable member, there are provided a first turn prohibition means adapted to prohibit said first turnable member from turning toward said first turning position from said first initial position with a predetermined force generated from a first biasing means, and a second turn prohibition means adapted to prohibit said first turnable member from turning toward said first initial position from said first turning position with a predetermined force generated from the first biasing means, said second hinge includes a second fixing member non-turnably disposed on said hinge main body and a second turnable member connected to said second fixing member such that said second turnable member is turnable between said second initial position and said second turning position, between said second fixing member and said second turnable member, there are provided a third turn prohibition means adapted to prohibit said second turnable member from turning toward said second turning position from said second initial position with a predetermined force generated from a second biasing means, and a fourth turn prohibition means adapted to prohibit said second turnable member from turning toward said second initial position from said second turning position with a predetermined force generated from the second biasing means, said turning direction toward said first turning position from said first initial position and said turning direction toward said second turning position from said second initial position are set to be same in direction, said turn prohibiting force of said first turn prohibition means is set to be larger than said turn prohibiting force of said third turn prohibition means, and said turn prohibiting force of said second turn prohibition means is set to be larger than said turn prohibiting force of said fourth turn prohibition means.

16. A two-axis hinge apparatus according to claim 15, wherein said first hinge further includes a first movable member disposed between said first fixing member and said first turnable member and connected to said first fixing member such that said first movable member is non-turnable but movable in the direction of said first turning axis, and said first biasing member adapted to bias said first movable member toward said first turnable member along said first turning axis, between confronting surfaces of said first turnable member and said first movable member, there are provided a first conversion means adapted to convert a biasing force of said first biasing means acting on said first movable member when said first turnable member is located in said first initial position, into a turn biasing force for turn biasing said first turnable member toward said first initial position from said first turning position, and a second conversion means adapted to convert a biasing force of said first biasing means acting on said first movable member when said first turnable member is located in said first turning position, into a turn biasing force for turn biasing said first turnable member toward said first turning position from said first initial position, said first turn prohibition means is constituted by said first conversion means and said first biasing means, and said second turn prohibition means is constituted by said second conversion means and said first biasing means, said second hinge further includes a second movable member disposed between said second fixing member and said second turnable member and connected to said second fixing member such that said second movable member is non-turnable but movable in the direction of said second turning axis, and said second biasing means adapted to bias said second movable member toward said second turnable member along said second turning axis, between confronting surfaces of said second turnable member and said second movable member, there are provided a third conversion means adapted to convert a biasing force of said second biasing means acting on said second movable member when said turnable movable member is located in said second initial position, into a turn biasing force for turn biasing said second turnable member toward said second initial position from said second turning position; and a fourth conversion means adapted to convert a biasing force of said second biasing means acting on said second movable member when said second turnable member is located in said second turning position, into a turn biasing force for turn biasing said second turnable member toward said second turning position from said second initial position, said third turn prohibition means is constituted by said third conversion means and said second biasing means, said fourth turn prohibition means is constituted by said fourth conversion means and said second biasing means, said second turnable member is turn biased by said third conversion means, and said second turnable member is turn biased by said fourth conversion means.

17. A two-axis hinge apparatus comprising a hinge main body, a first hinge disposed on said hinge main body with an axis thereof aligned with a first turning axis, and a second hinge disposed on said hinge main body with an axis thereof aligned with a second turning axis parallel to said first turning axis, wherein said first hinge includes a first fixing member non-turnably disposed on said hinge main body and a first turnable member connected to said first fixing member such that said first turnable member is turnable between a first initial position and a first turning position, between said first fixing member and said first turnable member, there are provided a first turn prohibition means adapted to prohibit said first turnable member from turning toward said first turning position from said first initial position with a predetermined force generated from a first biasing means, and a second turn prohibition means adapted to prohibit said first turnable member from turning toward said first initial position from said first turning position with a predetermined force generated from the first biasing means, said second hinge includes a second fixing member non-turnably disposed on said hinge main body and a second turnable member connected to said second fixing member such that said second turnable member is turnable between a second initial position and a second turning position, between said second fixing member and said second turnable member, there are provided a third turn prohibition means adapted to prohibit said second turnable member from turning toward said second turning position from said second initial position with a predetermined force generated from a second biasing means, and a fourth turn prohibition means adapted to prohibit said second turnable member from turning toward said second initial position from said second turning position with a predetermined force generated from the second biasing means, said turning direction toward said first turning position from said first initial position and said turning direction toward said second turning position from said second initial position are set to be same in direction, said turn prohibiting force of said first turn prohibition means is set to be smaller than said turn prohibiting force of said third turn prohibition means, and said turn prohibiting force of said second turn prohibition means is set to be larger than said turn prohibiting force of said fourth turn prohibition means.

18. A two-axis hinge apparatus according to claim 17, wherein said first hinge further includes a first movable member disposed between said first fixing member and said first turnable member and connected to said first fixing member such that said first movable member is non-turnable but movable in the direction of said first turning axis, and said first biasing means adapted to bias said first movable member toward said first turnable member along said first turning axis, between confronting surfaces of said first turnable member and said first movable member, there are provided a first conversion means adapted to convert a biasing force of said first biasing means acting on said first movable member when said first turnable member is located in said first initial position into a turn biasing force for turn biasing said first turnable member toward said first initial position from said first turning position, and a second conversion means adapted to convert a biasing force of said first biasing means acting on said first movable member when said first turnable member is located in said first turning position into a turn biasing force for turn biasing said first turnable member toward said first turning position from said first initial position, said first turn prohibition means is constituted by said first conversion means and said first biasing means, said second turn prohibition means is constituted by said second conversion means and said first biasing means, and said first turnable member is turn biased by said second conversion means, said second hinge further includes a second movable member disposed between said second fixing member and said second turnable member and connected to said second fixing member such that said second movable member is non-turnable but movable in the direction of said second turning axis, and said second biasing means adapted to bias said second movable member towards said second turnable member along said second turning axis, between confronting surfaces of said second turnable member and said second movable member, there are provided a third conversion means adapted to convert a biasing force of said second biasing means acting on said second movable member when said second turnable member is located in said second initial position into a turn biasing force for turn biasing said second turnable member toward said second initial position from said second turning position, and a fourth conversion means adapted to convert a biasing force of said second biasing means acting on said second movable member when said second turnable member is located in said second turning position into a turn biasing force for turn biasing said second turnable member toward said second turning position from said second initial position, and said third turn prohibition means is constituted by said third conversion means and said second biasing means, said fourth turn prohibition means is constituted by said fourth conversion means and said second biasing means, and said second turnable member is turn biased by said third conversion means.

* * * * *